US012551512B2

(12) United States Patent
Aguiló et al.

(10) Patent No.: US 12,551,512 B2
(45) Date of Patent: Feb. 17, 2026

(54) THERAPEUTIC EFFICACY BY PULMONARY DELIVERY OF LIVE ATTENUATED MYCOBACTERIA

(71) Applicant: UNIVERSIDAD DE ZARAGOZA, Saragossa (ES)

(72) Inventors: Juan Ignacio Aguiló, Saragossa (ES); Carlos Martín Montañes, Saragossa (ES); Raquel Tarancón Íñiguez, Saragossa (ES); Elena Mata Lozano, Saragossa (ES); Santiago Uranga Maíz, Saragossa (ES); Dessislava Vaneva Marinova, Saragossa (ES)

(73) Assignee: UNIVERSIDAD DE ZARAGOZA, Saragossa (ES)

( * ) Notice: Subject to any disclaimer, the term of this patent is extended or adjusted under 35 U.S.C. 154(b) by 576 days.

(21) Appl. No.: 17/764,127

(22) PCT Filed: Sep. 28, 2020

(86) PCT No.: PCT/EP2020/077145
§ 371 (c)(1),
(2) Date: Mar. 25, 2022

(87) PCT Pub. No.: WO2021/058831
PCT Pub. Date: Apr. 1, 2021

(65) Prior Publication Data
US 2023/0263837 A1    Aug. 24, 2023

(30) Foreign Application Priority Data

Sep. 26, 2019 (EP) .................................... 19382827

(51) Int. Cl.
| | | |
|---|---|---|
| A61K 35/74 | (2015.01) | |
| A61K 39/00 | (2006.01) | |
| A61P 11/06 | (2006.01) | |
| A61P 31/06 | (2006.01) | |
| A61P 37/08 | (2006.01) | |

(52) U.S. Cl.
CPC .............. *A61K 35/74* (2013.01); *A61P 11/06* (2018.01); *A61P 31/06* (2018.01); *A61P 37/08* (2018.01); *A61K 2039/522* (2013.01); *A61K 2039/544* (2013.01); *A61K 2039/577* (2013.01); *A61K 2039/58* (2013.01)

(58) Field of Classification Search
CPC .............. A61K 35/74; A61K 2039/522; A61K 2039/544; A61K 2039/577; A61K 2039/58; A61K 39/04; A61P 11/06; A61P 31/06; A61P 37/08; A61P 31/04; C07K 14/35
See application file for complete search history.

(56) References Cited

U.S. PATENT DOCUMENTS

| | | |
|---|---|---|
| 10,673,347 B2 | 6/2020 | Sarnago Andía et al. |
| 11,142,734 B2 | 10/2021 | Fernández Ledesma et al. |
| 11,224,744 B2 | 1/2022 | Sarnago Andía et al. |
| 2019/0366365 A1 | 12/2019 | Santamaría Ramiro et al. |
| 2021/0340196 A1 | 11/2021 | Anel Bernal et al. |

FOREIGN PATENT DOCUMENTS

| | | | | |
|---|---|---|---|---|
| WO | WO-2015126930 A2 * | 8/2015 | ............. | A61K 31/16 |
| WO | 2018/006939 A1 | 1/2018 | | |

OTHER PUBLICATIONS

Zhang Y et al. Immunization with an adenovirus-vectored TB vaccine containing Ag85A-Mtb32 effectively alleviates allergic asthma. J Mol Med (Berl). Apr. 2018;96(3-4):249-263. doi: 10.1007/s (Year: 2018) (Year: 2018).*
Capucilli P, Hill DA. Allergic Comorbidity in Eosinophilic Esophagitis: Mechanistic Relevance and Clinical Implications. Clin Rev Allergy Immunol. Aug. 2019;57(1):111-127. doi: 10.1007/s12016-019-08733-0. PMID: 30903437; PMCID: PMC6626558. (Year: 2019).*
U.S. Appl. No. 16/971,248, filed Aug. 19, 2020.
Arbués Arribas, "Construction and characterization of a new generation of phoP—based vaccines against tuberculosis," doctoral dissertation, Universidad de Zaragoza, Zaragoza, Spain, 2010. (157 pages).
Arbués et al., "Construction, characterization and preclinical evaluation of MTBVAC, the first live-attenuated *M. tuberculosis*-based vaccine to enter clinical trials," *Vaccine* 31:4867-4873, 2013.
Arnoldussen et al., "BCG vaccination and allergy: A systematic review and meta-analysis," *J Allergy Clin Immunol* 127:246-253, 2011.
Behr, "BCG—different strains, different vaccines?" *The Lancet Infectious Diseases* 2:86-92, Feb. 2002.
Braunstein et al., "Why Wait? The Case for Treating Tuberculosis with Inhaled Drugs," *Pharmaceutical Research* 36:166, 2019. (6 pages).
Camacho et al., "Analysis of the Phthiocerol Dimycocerosate Locus of *Mycobacterium tuberculosis*," *The Journal of Biological Chemistry* 276(23):19845-19854, Jun. 8, 2001.
Camacho et al., "Identification of a virulence gene cluster of *Mycobacterium tuberculosis* by signature-tagged transposon mutagenesis," *Molecular Microbiology* 34(2):257-267, 1999.

(Continued)

*Primary Examiner* — Suzanne M Noakes
*Assistant Examiner* — Ciara A Mcknight
(74) *Attorney, Agent, or Firm* — Seed Intellectual Property Law Group LLP

(57) ABSTRACT

The present invention is directed to a live-attenuated *Mycobacterium tuberculosis* composition comprising an isolated microorganism belonging to a *M. tuberculosis* MTBVAC strain having a i) PhoP-phenotype by the inactivation by a genetic deletion of the Rv0757 gene, wherein the open-reading frame (ORF) sequence of phoP consists of SEQ ID NO 4, and ii) the deletion of a second gene, Rv2930 (fadD26), that prevents PDIM production (PDIM-phenotype), wherein the open-reading frame (ORF) sequence of fadD26 consists of SEQ ID NO 2, for use in therapy in a human subject in need thereof, wherein the composition is administered to said subject via pulmonary delivery.

13 Claims, 12 Drawing Sheets

Specification includes a Sequence Listing.

(56) References Cited

OTHER PUBLICATIONS

Choi et al., "Therapeutic effects of BCG vaccination in adult asthmatic patients: a randomized, controlled trial," *Ann Allergy, Asthma, & Immunol* 88:584-591, 2002.

Cole et al., "Deciphering the biology of *Mycobacterium tuberculosis* from the complete genome sequence," *Nature* 393:537-544, Jun. 11, 1998.

Cox et al., "Complex lipid determines tissue-specific replication of *Mycobacterium tuberculosis* in mice," *Nature* 402:79-83, Nov. 4, 1999.

Díaz et al., "Comparative Metabolomics between *Mycobacterium tuberculosis* and the MTBVAC Vaccine Candidate," *ACS Infect. Dis.* 5:1317-1326, 2019.

Erb et al., "Infection of Mice with *Mycobacterium bovis*—Bacillus Calmette-Guérin (BCG) Suppresses Allergen-induced Airway Eosinophilia," *J. Exp. Med.* 187(4):561-569, Feb. 16, 1998.

Girodet et al., "Alternative Macrophage Activation is Increased in Asthma," *Am J Respir Cell Mol Biol* 55(4):467-475, Oct. 2016.

Gonzalo-Asensio et al., "MTBVAC: Attenuating the Human Pathogen of Tuberculosis (TB) Toward a Promising Vaccine against the TB Epidemic," *Frontiers in Immunology* 8:1803, Dec. 2017. (8 pages).

Guerra-Maupome et al., "Aerosol vaccination with Bacille Calmette-Guerin induces a trained innate immune phenotype in calves," *PLoS One* 14(2):e0212751, Feb. 22, 2019. (16 pages).

Holgate, "Innate and adaptive immune responses in asthma," *Nature Medicine* 18(5):673-683, May 2012.

Holgate et al., "Asthma," *Nat Rev Dis Primers* 1:15025, 2015. (22 pages).

Kwok et al., "Direct ex vivo analysis of allergen-specific CD4+ T cells," *J Allergy Clin Immunol.* 125(6):1407-1409.e1, Jun. 2010.

Lagranderie et al., "*Mycobacterium bovis* BCG killed by extended freeze-drying reduces airway hyperresponsiveness in 2 animal models," *J Allergy Clin Immunol* 121(2):471-478, 2008.

Malaga et al., "Production of unmarked mutations in mycobacteria using site-specific recombination," *FEMS Microbiology Letters* 219:261-268, 2003.

Marinova et al., "MTBVAC from discovery to clinical trials in tuberculosis-endemic countries," *Expert Review of Vaccines* 16(6):565-576, 2017.

Mills et al., "M-1/M-2 Macrophages and the Th1/Th2 Paradigm," *J Immunol* 164:6166-6173, 2000.

Moreira et al., "Serum amyloid P attenuates M2 macrophage activation and protects against fungal spore-induced allergic airway disease," *J Allergy Clin Immunol* 126:712-721, 2010.

Murray et al., "Protective and pathogenic functions of macrophage subsets," *Nature Reviews Immunology* 11:723-737, Nov. 2011.

Obihara et al., "*Mycobacterium tuberculosis* infection may protect against allergy in a tuberculosis endemic area," *Clinical and Experimental Allergy* 36:70-76, 2006.

O'Hehir et al., "T Cell Epitope Peptide Therapy for Allergic Diseases," *Curr Allergy Asthma Rep* 16:14, Jan. 14, 2016. (9 pages).

Pavord et al., "Mepolizumab for severe eosinophilic asthma (DREAM): a multicenter, double-blind, placebo-controlled trial," *Lancet* 380:651-659, Aug. 18, 2012.

Saradna et al., "Macrophage Polarization and Allergic Asthma," *Transl Res.* 191:1-14, Jan. 2018.

Sarinho et al., "BCG scar diameter and asthma: A case-control study," *J Allergy Clin Immunol* 106:1199-1200, Dec. 2000.

Schrager et al., "Developing aerosol vaccines for *Mycobacterium tuberculosis*: Workshop Proceedings: National Institute of Allergy and Infectious Diseases, Bethesda, Maryland, USA, Apr. 9, 2014," *Vaccine* 33:3038-3046, 2015.

Spertini et al., "Safety of human immunization with a live-attenuated *Mycobacterium tuberculosis* vaccine: a randomized, double-blind, controlled phase I trial," *Lancet Respir Med* 3(12):953-962, Dec. 1, 2015.

Stein et al., "Innate Immunity and Asthma Risk in Amish and Hutterite Farm Children," *N Engl J Med* 375(5):411-421, Aug. 4, 2016.

Strachan, "Hay fever, hygiene, and household size," *Br Med J* 299:1259-1260, Nov. 18, 1989.

Tameris et al., "Live-attenuated *Mycobacterium tuberculosis* vaccine MTBVAC versus BCG in adults and neonates: a randomized controlled, double-blind dose-escalation trial," *Lancet Respir Med* 7:757-770, Sep. 2019.

Tarancón et al., "*Mycobacterium tuberculosis* infection prevents asthma and abrogates eosinophilopoiesis in an experimental model," *Allergy* 74(12):2512-2514, Dec. 2019.

Trivedi et al., "Dissecting the Mechanism and Assembly of a Complex Virulence Mycobacterial Lipid," *Molecular Cell* 17:631-643, Mar. 4, 2005.

Tsujimura et al., "Effects of Mycobacteria Major Secretion Protein, Ag85B, on Allergic Inflammation in the Lung," *PLoS One* 9(9):e106807, Sep. 5, 2014.

Von Bubnoff et al., "Antigen-presenting cells in allergy," *J Allergy Clin Immunol* 108:329-339, 2001.

Von Mutius et al., "International patterns of tuberculosis and the prevalence of symptoms of asthma, rhinitis, and eczema," *Thorax* 55:449-453, 2000.

\* cited by examiner

```
                            SEQUENCE LISTING

<160> NUMBER OF SEQ ID NOS: 46

<210> SEQ ID NO 1
<211> LENGTH: 1752
<212> TYPE: DNA
<213> ORGANISM: Artificial Sequence
<220> FEATURE:
<223> OTHER INFORMATION: Wild-type fadD26 gene in Mt103
<220> FEATURE:
<221> NAME/KEY: misc_feature
<222> LOCATION: (1)..(1752)

<400> SEQUENCE: 1
atgccggtga ccgaccgttc agtgccctct ttgctgcaag agagggccga ccagcagcct      60
gacagcactg catatacgta catcgactac ggatccgacc ccaagggatt tgctgacagc     120
ttgacttggt cgcaggtcta cagtcgtgca tgcatcattg ctgaagaact caagttatgc     180
gggttacccg gagatcgagt ggcggtttta gcgccacaag gactggaata tgtccttgca     240
ttcctgggcg cacttcaggc tggatttatc gcggttccgc tgtcaactcc acagtatggc     300
attcacgatg accgcgtttc tgcggtgttg caggattcca agccggtagc cattctcacg     360
acttcgtccg tggtaggcga tgtaacgaaa tacgcagcca gccacgacgg gcagcctgcc     420
ccggtcgtag ttgaggttga tctgcttgat ttggactcgc cgcgacagat gccggctttc     480
tctcgtcagc acaccggggc ggcttatctc aatacacgt ccggatcgac gcgtacgccg     540
gccggagtca ttgtgtcgca cacgaatgtc attgccaatg tgacacaaag tatgtacggc     600
tatttcggcg atcccgcaaa gattccgacc gggactgtgg tgtcgtggct gcctttgtat     660
cacgatatgg gcctgattct cggaatttgc gcaccgctgg tggcccgacg ccgcgcgatg     720
ttgatgagcc caatgtcatt tttgcgccgt ccggcccgct ggatgcaact gcttgccacc     780
agcggccggt gcttttctgc ggcaccgaat ttcgccttcg agctggccgt gcgcagaaca     840
tctgaccagg acatggcggg gctcgacctg cgcgacgtgg tcggcatcgt cagtggcagt     900
gagcgaatcc atgtggcaac cgtgcggcgg ttcatcgagc ggttcgcgcc gtacaatctc     960
agccccaccg cgatacggcc gtcgtacggg ctcgcggaag cgaccttata tgtggcagct    1020
cccgaagccg gcgccgcgcc caagacggtc cgtttgact acgagcagct gaccgccggg    1080
caggctcggc cctgcggaac cgatgggtcg gtcggcaccg aactgatcag ctacggctcc    1140
cccgacccat cgtctgtgcg aatcgtcaac ccggagacca tggttgagaa tccgcctgga    1200
gtggtcggtg agatctgggt gcatggcgac cacgtgacta tggggtattg gcagaagccg    1260
aagcagaccg cgcaggtctt cgacgccaag ctggtcgatc ccgcgccggc agccccggag    1320
gggccgtggc tgcgcaccgg cgacctgggc gtcatttccg atggtgagct gttcatcatg    1380
ggccgcatca aagacctgct catcgtggac gggcgcaacc actaccccga cgacatcgag    1440
```

```
gcaacgatcc aggagatcac cggtggacgg gccgcggcga tcgcagtgcc cgacgacatc    1500
accgaacaac tggtggcgat catcgaattc aagcgacgcg gtagtaccgc cgaagaggtc    1560
atgctcaagc tccgctcggt gaagcgtgag gtcacctccg cgatatcgaa gtcacacagc    1620
ctgcgggtgg ccgatctcgt tctggtgtca cctggttcga ttcccatcac caccagcggc    1680
aagatccggc ggtcagcctg cgtcgaacgc tatcgcagcg acggcttcaa gcggctggac    1740
gtagccgtat ga                                                        1752

<210> SEQ ID NO 2
<211> LENGTH: 410
<212> TYPE: DNA
<213> ORGANISM: Artificial Sequence
<220> FEATURE:
<223> OTHER INFORMATION: fadD26 in MTBVAC
<220> FEATURE:
<221> NAME/KEY: misc_feature
<222> LOCATION: (1)..(410)

<400> SEQUENCE: 2
atgccggtga ccgaccgttc agtgccctct ttgctgcaag agagggccga ccagcagcct      60
gacagcactg catatacgta catcgactac ggatccacta gttctagagc aaccgtccga     120
aatattataa attatcgcac acataaaaac agtgctgtta atgtgtctat taaatcgatt     180
ttttgttata acagacactg cttgtccgat atttgattta ggatacattt ttatgagatc     240
ccccgggctg caggaattcg atatcgaagt cacacagcct gcgggtggcc gatctcgttc     300
tggtgtcacc tggttcgatt cccatcacca ccagcggcaa gatccggcgg tcagcctgcg     360
tcgaacgcta tcgcagcgac ggcttcaagc ggctggacgt agccgtatga                 410

<210> SEQ ID NO 3
<211> LENGTH: 744
<212> TYPE: DNA
<213> ORGANISM: Artificial Sequence
<220> FEATURE:
<223> OTHER INFORMATION: Wild-type phoP gene in Mt103
<220> FEATURE:
<221> NAME/KEY: misc_feature
<222> LOCATION: (1)..(744)

<400> SEQUENCE: 3
atgcggaaag gggttgatct cgtgacggcg ggaaccccag gcgaaaacac cacaccggag      60
gctcgtgtcc tcgtggtcga tgatgaggcc aacatcgttg aactgctgtc ggtgagcctc     120
aagttccagg gctttgaagt ctacaccgcg accaacgggg cacaggcgct ggatcgggcc     180
cgggaaaccc ggccggacgc ggtgatcctc gatgtgatga tgcccgggat ggacggcttt     240
ggggtgctgc gccggctgcg cgccgacggc atcgatgccc ggcgttgtt cctgacggcc      300 cgtgactcgc tacaggacaa gatcgcgggt ctgaccctgg tggtgacga ctatgtgaca      360 aagcccttca gtttggagga ggtcgtggcc aggctgcggg tcatcctgcg acgcgcgggc     420
aagggcaaca aggaaccacg taatgttcga ctgacgttcg ccgatatcga gctcgacgag     480
gagacccacg aagtgtggaa ggcgggccaa ccggtgtcgc tgtcgcccac cgaattcacc     540
ctgctgcgct atttcgtgat caacgcgggc accgtgctga gcaagcctaa gattctcgac     600
cacgtttggc gctacgactt cggtggtgat gtcaacgtcg tcgagtccta cgtgtcgtat     660
ctgcgccgca agatcgacac tggggagaag cggctgctgc acacgctgcg cggggtgggc     720
tacgtactgc gggagcctcg atga                                            744
```

```
<210> SEQ ID NO 4
<211> LENGTH: 819
<212> TYPE: DNA
<213> ORGANISM: Artificial Sequence
<220> FEATURE:
<223> OTHER INFORMATION: Truncated phoP in MTBVAC
<220> FEATURE:
<221> NAME/KEY: misc_feature
<222> LOCATION: (1)..(819)

<400> SEQUENCE: 4
atgcggaaag gggttgatct cgtgacggcg ggaaccccag gcgaaaacac cacaccggag      60
gctcgtgtcc tcgtggtcga tgatgaggcc aacatcgttg aactgctgtc ggtgagcctc     120
aagttccagg gctttgaagt ctacaccgcg accaacgggg cacaggcgct ggatcgggcc     180
cgggaaaccc ggccggacgc ggtgatcctc gatgtgatga tgcccgggat ggacggcttt     240
ggggtgctgc gccggctgcg cgccgacggc atcgatgccc cggcgttgtt cctgacggcc     300
cgtgactcgc tacaggacaa gatcgcgggt ctgaccctgg gtggtgacga ctatgtgaca     360
aagcccttca gtttggagga ggtcgtggcc aggctgcggg tcatcctgcg acgcgcgggc     420
aagggcaaca aggaaccacg taatgttcga ctgacgttcg ccgatatcga attcctgcag     480
cccgggggat ctcataaaaa tgtatcctaa atcaaatatc ggacaagcag tgtctgttat     540
aacaaaaaat cgatttaata gacacattaa cagcactgtt tttatgtgtg cgataattta     600
taatatttcg gacggttgct ctagaactag tggatcaacg cgggcaccgt gctgagcaag     660
cctaagattc tcgaccacgt ttggcgctac gacttcggtg gtgatgtcaa cgtcgtcgag     720
tcctacgtgt cgtatctgcg ccgcaagatc gacactgggg agaagcggct gctgcacacg     780
ctgcgcgggg tgggctacgt actgcgggag cctcgatga                           819

<210> SEQ ID NO 5
<211> LENGTH: 20
<212> TYPE: DNA
<213> ORGANISM: Artificial Sequence
<220> FEATURE:
<223> OTHER INFORMATION: Forward primer actin
<220> FEATURE:
<221> NAME/KEY: misc_feature
<222> LOCATION: (1)..(20)

<400> SEQUENCE: 5
accagttcgc catggatgac                                                  20

<210> SEQ ID NO 6
<211> LENGTH: 16
<212> TYPE: DNA
<213> ORGANISM: Artificial Sequence
<220> FEATURE:
<223> OTHER INFORMATION: Reverse primer actin
<220> FEATURE:
<221> NAME/KEY: misc_feature
<222> LOCATION: (1)..(16)

<400> SEQUENCE: 6
tgccggagcc gttgtc                                                      16

<210> SEQ ID NO 7
<211> LENGTH: 19
<212> TYPE: DNA
<213> ORGANISM: Artificial Sequence
<220> FEATURE:
<223> OTHER INFORMATION: Forward primer 18S
<220> FEATURE:
<221> NAME/KEY: misc_feature
```

```
<222> LOCATION: (1)..(19)

<400> SEQUENCE: 7
ttcgtattgc gccgctaga                                                    19

<210> SEQ ID NO 8
<211> LENGTH: 20
<212> TYPE: DNA
<213> ORGANISM: Artificial Sequence
<220> FEATURE:
<223> OTHER INFORMATION: Reverse primer 18S
<220> FEATURE:
<221> NAME/KEY: misc_feature
<222> LOCATION: (1)..(20)

<400> SEQUENCE: 8
ctttcgctct ggtccgtctt                                                   20

<210> SEQ ID NO 9
<211> LENGTH: 20
<212> TYPE: DNA
<213> ORGANISM: Artificial Sequence
<220> FEATURE:
<223> OTHER INFORMATION: Forward primer Gata3
<220> FEATURE:
<221> NAME/KEY: misc_feature
<222> LOCATION: (1)..(20)

<400> SEQUENCE: 9
gacccgaaac cggaagatgt                                                   20

<210> SEQ ID NO 10
<211> LENGTH: 18
<212> TYPE: DNA
<213> ORGANISM: Artificial Sequence
<220> FEATURE:
<223> OTHER INFORMATION: Reverse primer Gata3
<220> FEATURE:
<221> NAME/KEY: misc_feature
<222> LOCATION: (1)..(18)

<400> SEQUENCE: 10
gcgcgtcatg cacctttt                                                     18

<210> SEQ ID NO 11
<211> LENGTH: 21
<212> TYPE: DNA
<213> ORGANISM: Artificial Sequence
<220> FEATURE:
<223> OTHER INFORMATION: Forward primer Il12a
<220> FEATURE:
<221> NAME/KEY: misc_feature
<222> LOCATION: (1)..(21)

<400> SEQUENCE: 11
acgcagcact tcagaatcac a                                                 21

<210> SEQ ID NO 12
<211> LENGTH: 20
<212> TYPE: DNA
<213> ORGANISM: Artificial Sequence
<220> FEATURE:
<223> OTHER INFORMATION: Reverse primer Il12a
<220> FEATURE:
<221> NAME/KEY: misc_feature
<222> LOCATION: (1)..(20)

<400> SEQUENCE: 12
```

```
caccagcatg cccttgtcta                                              20

<210> SEQ ID NO 13
<211> LENGTH: 19
<212> TYPE: DNA
<213> ORGANISM: Artificial Sequence
<220> FEATURE:
<223> OTHER INFORMATION: Forward primer Il12b
<220> FEATURE:
<221> NAME/KEY: misc_feature
<222> LOCATION: (1)..(19)

<400> SEQUENCE: 13
tggagcactc cccattcct                                               19

<210> SEQ ID NO 14
<211> LENGTH: 18
<212> TYPE: DNA
<213> ORGANISM: Artificial Sequence
<220> FEATURE:
<223> OTHER INFORMATION: Reverse primer Il12b
<220> FEATURE:
<221> NAME/KEY: misc_feature
<222> LOCATION: (1)..(18)

<400> SEQUENCE: 14
tgcgctggat tcgaacaa                                                18

<210> SEQ ID NO 15
<211> LENGTH: 20
<212> TYPE: DNA
<213> ORGANISM: Artificial Sequence
<220> FEATURE:
<223> OTHER INFORMATION: Foward primer Ifng
<220> FEATURE:
<221> NAME/KEY: misc_feature
<222> LOCATION: (1)..(20)

<400> SEQUENCE: 15
ttggctttgc agctcttcct                                              20

<210> SEQ ID NO 16
<211> LENGTH: 19
<212> TYPE: DNA
<213> ORGANISM: Artificial Sequence
<220> FEATURE:
<223> OTHER INFORMATION: Reverse primer Ifng
<220> FEATURE:
<221> NAME/KEY: misc_feature
<222> LOCATION: (1)..(19)

<400> SEQUENCE: 16
tgactgtgcc gtggcagta                                               19

<210> SEQ ID NO 17
<211> LENGTH: 23
<212> TYPE: DNA
<213> ORGANISM: Artificial Sequence
<220> FEATURE:
<223> OTHER INFORMATION: Forward primer Il5
<220> FEATURE:
<221> NAME/KEY: misc_feature
<222> LOCATION: (1)..(23)

<400> SEQUENCE: 17
ttgacaagca atgagacgat gag                                          23

<210> SEQ ID NO 18
```

```
<211> LENGTH: 22
<212> TYPE: DNA
<213> ORGANISM: Artificial Sequence
<220> FEATURE:
<223> OTHER INFORMATION: Reverse primer Il5
<220> FEATURE:
<221> NAME/KEY: misc_feature
<222> LOCATION: (1)..(22)

<400> SEQUENCE: 18
tccaatgcat agctggtgat tt                                              22

<210> SEQ ID NO 19
<211> LENGTH: 20
<212> TYPE: DNA
<213> ORGANISM: Artificial Sequence
<220> FEATURE:
<223> OTHER INFORMATION: Foward primer Il4
<220> FEATURE:
<221> NAME/KEY: misc_feature
<222> LOCATION: (1)..(20)

<400> SEQUENCE: 19
ggagatggat gtgccaaacg                                                 20

<210> SEQ ID NO 20
<211> LENGTH: 22
<212> TYPE: DNA
<213> ORGANISM: Artificial Sequence
<220> FEATURE:
<223> OTHER INFORMATION: Reverse primer Il4
<220> FEATURE:
<221> NAME/KEY: misc_feature
<222> LOCATION: (1)..(22)

<400> SEQUENCE: 20
cgagctcact ctctgtggtg tt                                              22

<210> SEQ ID NO 21
<211> LENGTH: 22
<212> TYPE: DNA
<213> ORGANISM: Artificial Sequence
<220> FEATURE:
<223> OTHER INFORMATION: Forward primer Il13
<220> FEATURE:
<221> NAME/KEY: misc_feature
<222> LOCATION: (1)..(22)

<400> SEQUENCE: 21
ttgaggagct gagcaacatc ac                                              22

<210> SEQ ID NO 22
<211> LENGTH: 16
<212> TYPE: DNA
<213> ORGANISM: Artificial Sequence
<220> FEATURE:
<223> OTHER INFORMATION: Reverse primer Il13
<220> FEATURE:
<221> NAME/KEY: misc_feature
<222> LOCATION: (1)..(16)

<400> SEQUENCE: 22
ccatgctgcc gttgca                                                     16

<210> SEQ ID NO 23
<211> LENGTH: 21
<212> TYPE: DNA
<213> ORGANISM: Artificial Sequence
<220> FEATURE:
```

<223> OTHER INFORMATION: Forward primer Stat1
<220> FEATURE:
<221> NAME/KEY: misc_feature
<222> LOCATION: (1)..(21)

<400> SEQUENCE: 23
ctctggaatg atgggtgcat t                                              21

<210> SEQ ID NO 24
<211> LENGTH: 19
<212> TYPE: DNA
<213> ORGANISM: Artificial Sequence
<220> FEATURE:
<223> OTHER INFORMATION: Revese primer Stat1
<220> FEATURE:
<221> NAME/KEY: misc_feature
<222> LOCATION: (1)..(19)

<400> SEQUENCE: 24
ttgagcagag cgcgttctc                                                 19

<210> SEQ ID NO 25
<211> LENGTH: 21
<212> TYPE: DNA
<213> ORGANISM: Artificial Sequence
<220> FEATURE:
<223> OTHER INFORMATION: Forward primer Stat4
<220> FEATURE:
<221> NAME/KEY: misc_feature
<222> LOCATION: (1)..(21)

<400> SEQUENCE: 25
catttgcaac ccaaggagat g                                              21

<210> SEQ ID NO 26
<211> LENGTH: 17
<212> TYPE: DNA
<213> ORGANISM: Artificial Sequence
<220> FEATURE:
<223> OTHER INFORMATION: Reverse primer Stat4
<220> FEATURE:
<221> NAME/KEY: misc_feature
<222> LOCATION: (1)..(17)

<400> SEQUENCE: 26
tggcagccct cgtttcc                                                   17

<210> SEQ ID NO 27
<211> LENGTH: 22
<212> TYPE: DNA
<213> ORGANISM: Artificial Sequence
<220> FEATURE:
<223> OTHER INFORMATION: Forward primer Stat6
<220> FEATURE:
<221> NAME/KEY: misc_feature
<222> LOCATION: (1)..(22)

<400> SEQUENCE: 27
aactgcaacg gctctatgtt ga                                             22

<210> SEQ ID NO 28
<211> LENGTH: 20
<212> TYPE: DNA
<213> ORGANISM: Artificial Sequence
<220> FEATURE:
<223> OTHER INFORMATION: Reverse primer Stat6
<220> FEATURE:
<221> NAME/KEY: misc_feature
<222> LOCATION: (1)..(20)

```
<400> SEQUENCE: 28
agccagtcag ccaggagatg                                               20

<210> SEQ ID NO 29
<211> LENGTH: 20
<212> TYPE: DNA
<213> ORGANISM: Artificial Sequence
<220> FEATURE:
<223> OTHER INFORMATION: Forward primer Tnf
<220> FEATURE:
<221> NAME/KEY: misc_feature
<222> LOCATION: (1)..(20)

<400> SEQUENCE: 29
cagccgatgg gttgtacctt                                               20

<210> SEQ ID NO 30
<211> LENGTH: 18
<212> TYPE: DNA
<213> ORGANISM: Artificial Sequence
<220> FEATURE:
<223> OTHER INFORMATION: Reverse primer Tnf
<220> FEATURE:
<221> NAME/KEY: misc_feature
<222> LOCATION: (1)..(18)

<400> SEQUENCE: 30
ggcagccttg tcccttga                                                 18

<210> SEQ ID NO 31
<211> LENGTH: 22
<212> TYPE: DNA
<213> ORGANISM: Artificial Sequence
<220> FEATURE:
<223> OTHER INFORMATION: Forward primer T Bet
<220> FEATURE:
<221> NAME/KEY: misc_feature
<222> LOCATION: (1)..(22)

<400> SEQUENCE: 31
acctgttgtg gtccaagttc aa                                            22

<210> SEQ ID NO 32
<211> LENGTH: 21
<212> TYPE: DNA
<213> ORGANISM: Artificial Sequence
<220> FEATURE:
<223> OTHER INFORMATION: Reverse primer T Bet
<220> FEATURE:
<221> NAME/KEY: misc_feature
<222> LOCATION: (1)..(21)

<400> SEQUENCE: 32
gccgtccttg cttagtgatg a                                             21

<210> SEQ ID NO 33
<211> LENGTH: 22
<212> TYPE: DNA
<213> ORGANISM: Artificial Sequence
<220> FEATURE:
<223> OTHER INFORMATION: Forward primer Ifnb1
<220> FEATURE:
<221> NAME/KEY: misc_feature
<222> LOCATION: (1)..(22)

<400> SEQUENCE: 33
ccctatggag atgacggaga ag                                            22
```

<210> SEQ ID NO 34
<211> LENGTH: 21
<212> TYPE: DNA
<213> ORGANISM: Artificial Sequence
<220> FEATURE:
<223> OTHER INFORMATION: Reverse primer Ifnb1
<220> FEATURE:
<221> NAME/KEY: misc_feature
<222> LOCATION: (1)..(21)

<400> SEQUENCE: 34
gagcatctct tggatggcaa a                                              21

<210> SEQ ID NO 35
<211> LENGTH: 20
<212> TYPE: DNA
<213> ORGANISM: Artificial Sequence
<220> FEATURE:
<223> OTHER INFORMATION: Forward primer CC111
<220> FEATURE:
<221> NAME/KEY: misc_feature
<222> LOCATION: (1)..(20)

<400> SEQUENCE: 35
gaccaggttg ggcaaagaga                                                20

<210> SEQ ID NO 36
<211> LENGTH: 20
<212> TYPE: DNA
<213> ORGANISM: Artificial Sequence
<220> FEATURE:
<223> OTHER INFORMATION: Reverse primer CC111
<220> FEATURE:
<221> NAME/KEY: misc_feature
<222> LOCATION: (1)..(20)

<400> SEQUENCE: 36
ggcatcctgg acccacttct                                                20

<210> SEQ ID NO 37
<211> LENGTH: 18
<212> TYPE: DNA
<213> ORGANISM: Artificial Sequence
<220> FEATURE:
<223> OTHER INFORMATION: Forward primer Ym1
<220> FEATURE:
<221> NAME/KEY: misc_feature
<222> LOCATION: (1)..(18)

<400> SEQUENCE: 37
gtctggcccc tggacatg                                                  18

<210> SEQ ID NO 38
<211> LENGTH: 23
<212> TYPE: DNA
<213> ORGANISM: Artificial Sequence
<220> FEATURE:
<223> OTHER INFORMATION: Reverse primer Ym1
<220> FEATURE:
<221> NAME/KEY: misc_feature
<222> LOCATION: (1)..(23)

<400> SEQUENCE: 38
agagggaaat gtctctggtg aca                                            23

<210> SEQ ID NO 39
<211> LENGTH: 20

```
<212> TYPE: DNA
<213> ORGANISM: Artificial Sequence
<220> FEATURE:
<223> OTHER INFORMATION: Forward primer Il1b
<220> FEATURE:
<221> NAME/KEY: misc_feature
<222> LOCATION: (1)..(20)

<400> SEQUENCE: 39
agttgacgga ccccaaaaga                                               20

<210> SEQ ID NO 40
<211> LENGTH: 19
<212> TYPE: DNA
<213> ORGANISM: Artificial Sequence
<220> FEATURE:
<223> OTHER INFORMATION: Reverse primer Il1b

<400> SEQUENCE: 40
ggacagccca ggtcaaagg                                                19

<210> SEQ ID NO 41
<211> LENGTH: 20
<212> TYPE: DNA
<213> ORGANISM: Artificial Sequence
<220> FEATURE:
<223> OTHER INFORMATION: Forward primer Retnla
<220> FEATURE:
<221> NAME/KEY: misc_feature
<222> LOCATION: (1)..(20)

<400> SEQUENCE: 41
cagctgatgg tcccagtgaa                                               20

<210> SEQ ID NO 42
<211> LENGTH: 24
<212> TYPE: DNA
<213> ORGANISM: Artificial Sequence
<220> FEATURE:
<223> OTHER INFORMATION: Reverse primer Rtnla
<220> FEATURE:
<221> NAME/KEY: misc_feature
<222> LOCATION: (1)..(24)

<400> SEQUENCE: 42
ttccttgacc ttattctcca cgat                                          24

<210> SEQ ID NO 43
<211> LENGTH: 19
<212> TYPE: DNA
<213> ORGANISM: Artificial Sequence
<220> FEATURE:
<223> OTHER INFORMATION: Forward primer Nos2
<220> FEATURE:
<221> NAME/KEY: misc_feature
<222> LOCATION: (1)..(19)

<400> SEQUENCE: 43
ggatcttccc aggcaacca                                                19

<210> SEQ ID NO 44
<211> LENGTH: 21
<212> TYPE: DNA
<213> ORGANISM: Artificial Sequence
<220> FEATURE:
<223> OTHER INFORMATION: Revese primer Nos2
<220> FEATURE:
<221> NAME/KEY: misc_feature
<222> LOCATION: (1)..(21)
```

```
<400> SEQUENCE: 44
tccacaactc gctccaagat t                                              21

<210> SEQ ID NO 45
<211> LENGTH: 22
<212> TYPE: DNA
<213> ORGANISM: Artificial Sequence
<220> FEATURE:
<223> OTHER INFORMATION: Forward primer Arg1
<220> FEATURE:
<221> NAME/KEY: misc_feature
<222> LOCATION: (1)..(22)

<400> SEQUENCE: 45
gctccaagcc aaagtcctta ga                                             22

<210> SEQ ID NO 46
<211> LENGTH: 20
<212> TYPE: DNA
<213> ORGANISM: Artificial Sequence
<220> FEATURE:
<223> OTHER INFORMATION: Reverse primer Arg1
<220> FEATURE:
<221> NAME/KEY: misc_feature
<222> LOCATION: (1)..(20)

<400> SEQUENCE: 46
cctcgaggct gtccttttga                                                20
```

THERAPEUTIC EFFICACY BY PULMONARY DELIVERY OF LIVE ATTENUATED MYCOBACTERIA

STATEMENT REGARDING SEQUENCE LISTING

The Sequence Listing associated with this application is provided in text format in lieu of a paper copy, and is hereby incorporated by reference into the specification. The name of the text file containing the Sequence Listing is 920188_402USPC_SEQUENCE_LISTING.txt. The text file is 15.7 KB, was created on Mar. 22, 2022, and is being submitted electronically via EFS-Web.

BACKGROUND

Technical Field

This invention relates to pharmaceutical compositions, such as vaccines, and methods of making and using such compositions.

Description of the Related Art

According to WHO (World Health Organization), asthma has reached epidemic levels, with more than 200 million asthmatic individuals all around the world. Although especially prevalent among developed countries, incidence is rapidly increasing also in low- and middle-income scenarios. One of the most accepted explanations about the increment of asthma during the last decades is the called "Hygiene hypothesis," that suggests that one of the causes behind this dramatic increase is consequence of the lower exposure of children to determined environmental factors (Strachan D P. Hay fever, hygiene, and household size. BMJ 1989; 299:1259-60). In this regard, exposure to certain microorganisms and mites (as those present in farms) during early life stages seems to educate the immune system leading to the acquisition of a higher tolerance to allergens (Stein M M, Hrusch C L, Gozdz J, Igartua C, Pivniouk V, Murray S E, et al. innate Immunity and Asthma Risk in Amish and Hutterite Farm Children. N Engl J Med 2016; 375:411-21).

Asthma is a heterogeneous disease characterized by chronic airway inflammation and remodeling. Even though asthma can be associated with different types of inflammatory response, type 2 inflammation is present in more than 80% of asthma cases in children. T helper (Th) lymphocytes with a Th2 profile are present in most of the patients, producing cytokines such as IL-4, IL-5 or IL-13 which are responsible for some of the characteristic clinical symptomatology. IL-5 plays a central role in the survival and recruitment of eosinophils, one of the main players in asthma, and whose presence in sputum represents one of the most accepted biomarkers for the diagnosis of the disease. In addition, IL-4 and IL-13 trigger airway remodeling by inducing proliferation of airway epithelial cells as well as exacerbated mucus production (Holgate S T, Wenzel S, Postma D S, Weiss S T, Renz H, Sly P D. Asthma. Nat Rev Dis Primers 2015; 1:15025).

In addition, during the last years, different studies of the adaptive response have evidenced the crucial importance of lung innate populations for asthma triggering. Indeed, allergen presentation through MHC-II molecules from antigen-presenting cells (APC) results essential to induce allergen-specific T cells (Holgate S T. Innate and adaptive immune responses in asthma. Nat Med 2012; 18:673-83). Asthma has been linked with a pathological macrophage polarization towards an M2 phenotype (Girodet P O, Nguyen D, Mancini J D, Hundal M, Zhou X, Israel E, et al. Alternative Macrophage Activation Is Increased in Asthma. Am J Respir Cell Mol Biol 2016; 55:467-75). Macrophages type M2, or alternatively activated, adopt regulatory skills, and trigger an immune modulatory environment that impairs Th1 response and favors expansion of Th2 cells (Mills C D, Kincaid K, Alt J M, Heilman M J, Hill A M. M-1/M-2 macrophages and the Th1/Th2 paradigm. J Immunol 2000; 164:6166-73). Thus, exacerbated levels of M2 macrophages have been found in animal asthma models as well as samples from patients. Therapies targeting M2 macrophages have been shown to alleviate allergic responsiveness (Moreira A P, Cavassani K A, Hullinger R, Rosada R S, Fong D J, Murray L, et al. Serum amyloid P attenuates M2 macrophage activation and protects against fungal spore-induced allergic airway disease. J Allergy Clin Immunol 2010; 126:712-21 e7).

The current tuberculosis vaccine, BCG, is the most administered vaccine in the history. Since BCG has been classically considered as a Th1 response-promoting vaccine, it is been discussed for years the benefits of intradermal BCG vaccination for asthma. Conclusions about this question remain controversial, with different epidemiological studies showing opposite results.

BCG vaccines, both live and inactivated, as well as different mycobacterial components, have been extensively proven to be efficient against asthma in different animal models (Erb K J et al. J Exp Med 1998; 187:561-9. Lagranderie M et al. J Allergy Clin Immunol 2008; 121:471-8. Tsujimura Y et al. PLoS One 2014; 9:e106807). However, most of these results have been obtained with BCG delivered prior or concurrently to allergen sensitization. As a result, it is not been addressed the capacity of BCG to revert established asthma, which would be crucial to elucidate the therapeutic potential of this vaccine as asthma treatment. In addition, previous studies have focused mainly on the Th1/Th2 response balance without paying attention to other arms from the immune system involved in asthma, such as pulmonary alveolar macrophages, which seem to play major roles during asthma development.

MTBVAC is a live vaccine based on *Mycobacterium tuberculosis* attenuation (Arbues A et al. Vaccine 2013; 31:4867-73), that has demonstrated to be more immunogenic and protective against tuberculosis in different animal models (Gonzalo-Asensio J et al. Front Immunol. 2017 Dec. 15; 8:1803. doi: 10.3389/fimmu.2017.01803), and that has been shown to be safe and immunogenic in human adult and newborn population (Spertini F et al. Lancet Respir Med 2015; 3:953-62. Tameris et al, Lancet Respir Med 2019. IN PRESS). Currently, MTBVAC is being evaluated in two phase IIa studies to define the dose for efficacy trials as tuberculosis vaccine.

BRIEF SUMMARY

In the present invention, we evaluated the therapeutic efficacy of live attenuated vaccines MTBVAC and BCG, by the intranasal route, in different models of acute asthma, administered over already allergen-sensitized mice. We hypothesized that by direct interplay between bacteria and the lung compartment, the vaccine could modulate immune environment linked with asthma. In this sense, our results have revealed that both vaccines were able to re-educate M2 macrophages induced by allergen administration towards an M1 phenotype, as well as to turn allergen-specific Th2 lymphocytes into Th1. Importantly, our data showed strong therapeutic efficacy of both BCG and MTBVAC given over allergen-challenged mice, in a scenario of established disease, demonstrating the potential of live attenuated tuberculosis vaccines as therapy for asthma. We also demonstrated an optimal protection of MTBVAC intranasal against a challenge with *M. tuberculosis*, suggesting that the pulmonary route of administration could result more advantageous not only to treat asthma, but also to prevent tuberculosis.

BRIEF DESCRIPTION OF THE SEVERAL VIEWS OF THE DRAWINGS

FIG. 12. A, OMRON® U100 nebulizer used for the experiment carried out for this figure. B, MTBVAC and BCG OncoTICE® CFUs determined in nebulized and reservoir fractions. C, Nebulization efficacy index calculated as the percentage of bacteria recovered in the nebulized fraction compared to the contained in the reservoir. Each dot corresponds to the result obtained with a different filter. Data in the graph represents mean±SEM from six independent nebulizations with MTBVAC, and three with BCG Onco-TICE®. *p<0.05, by t-student test.

DETAILED DESCRIPTION

Definitions

Figure 1:
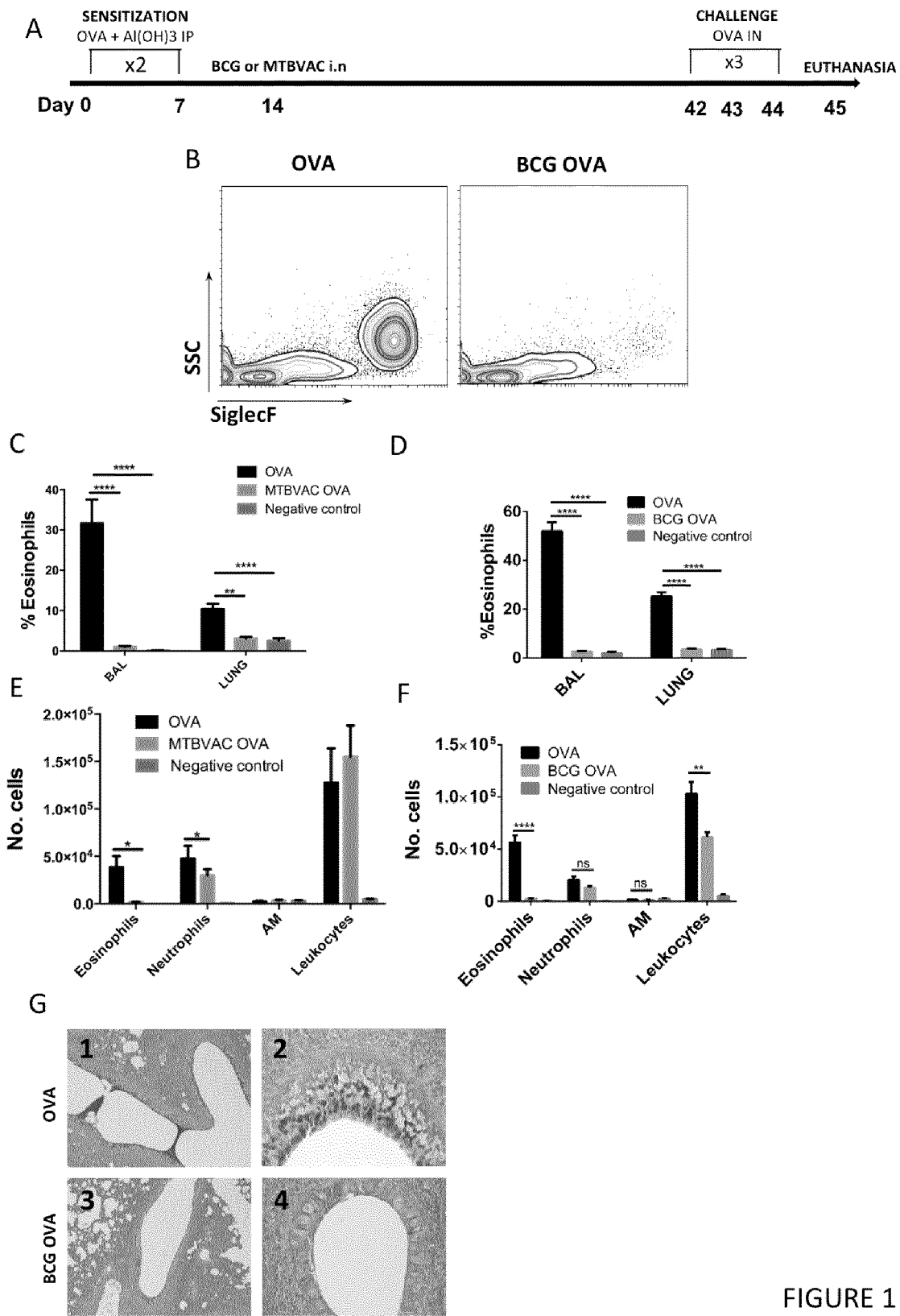
FIG. 1. BCG and MTBVAC intranasal prevent allergic airway responsiveness in allergen-sensitized mice. Eosinophils were determined by flow cytometry in an OVA-driven acute asthma model, with mice treated intranasally with $10^6$ BCG or $10^7$ MTBVAC CFUs one week after second sensitization. (A) Eosinophils were determined by flow cytometry as SSChighSiglecF+CD11b+CD11 b– cells. A representative diagram is shown in the figure (B) Percentage of eosinophils in BAL and lungs in MTBVAC (C) or BCG (D) treated mice. Total number of leukocytes, eosinophils, neutrophils and alveolar macrophages (AMs) in BAL determined by flow cytometry in MTBVAC (E) or BCG (F) treated mice. (E) Representative images of PAS-stained fixed lungs from OVA-challenged mice untreated (1,2) or BCG-treated (3,4). In purple it is stained the mucosal substances and the goblet cells (G). Data in the graphs are mean±SEM representative from three independent experiments. A minimum of 6 mice was used per group and experiment. $*p<0.05$; $p<0.01$; $*p<0.001$; $****p<0.0001$, by two-way ANOVA with Bonferroni post-test analysis.

The "MTBVAC strain" will be used to refer to the isolated microorganism of the *M. tuberculosis* strain that has deleted the Rv0757 gene in *M. tuberculosis* Mt103 clinical strain and which additionally comprises the deletion of the Rv2930 (fadD26) gene. Therefore, said strain presents two independent mutations derived from *M. tuberculosis*, the independent phoP deletion not affecting the properties of the vaccine derived from the inactivation of said gene. Therefore, "the MTBVAC strain" is characterized in that PDIM production is inactivated through the deletion of the Rv2930 (fadD26) gene, and thus this strain is characterized in that it comprises the deletion of the Rv2930 and Rv0757 genes.

It is thus noted that the MTBVAC strain was constructed to contain two independent non-reverting deletion mutations, without antibiotic markers, fulfilling the first Geneva consensus safety requirements for advancing live mycobacterial vaccines to phase I clinical evaluation. The MTBVAC strain was genetically engineered to phenotypically and functionally resemble its prototype SO2. SO2 is a marked Mt103 phoP mutant by the insertion of a kanamycin resistance cassette (kmr) (Mt103phoP::kmr), which in addition to the engineered PhoP-deficient phenotype, SO2 has an acquired spontaneous loss in PDIM biosynthesis (see FIG. 2 of Dessislava Marinova, Jesus Gonzalo-Asensio, Nacho Aguilo & Carlos Martin (2017) MTBVAC from discovery to clinical trials in tuberculosis-endemic countries, Expert Review of Vaccines, 16:6, 565-576, DOI: 10.1080/14760584.2017.1324303), a process described to be common in *M. tuberculosis* as result of repeated laboratory subculture and manipulation practices.

The MTBVAC strain was constructed following a stepwise approach. First, the unmarked deletion in fadD26 was introduced in SO2, giving rise to SO2ΔfadD26. Consequently, the unmarked deletion in phoP in SO2ΔfadD26 generated the MTBVAC strain. For construction of MTB-VAC, suicide plasmids harboring the deleted fadD26 and phoP genes, whose deleted regions were interrupted with a hygromycin resistance marker (hygr) flanked by res sites on each side (res::hygr::res), were used. γδ-resolvase from *E. coli* catalyzed the excision of the antibiotic resistance cassette following recognition of the res sites, thereafter leaving a copy of a residual res "scar" in place of the deletion (Malaga, et al. 2003); res sites do not contain any exogenous coding sequence. The final construct SO2ΔfadD26::ΔphoP was named MTBVAC strain. In the MTBVAC strain, the introduction of an unmarked deletion in fadD26 ensures a genetically stable abolishment of PDIM biosynthesis. The size of the generated deletion in the gene fadD26 comprises 1.511 bp and results in complete inactivation of this essential gene in PDIM biosynthesis. The wild-type gene is 1.752 bp (583 amino acids). A residual res scar was left in the process of the excision of hygr by γδ-resolvase. As a result of this deletion, the transcription levels of the next five genes in the PDIM locus (fadD26-ppsE) are diminished and PDIM biosynthesis in MTBVAC is completely abolished (Ainhoa Arbues PhD Thesis). The PDIM locus in *M. tuberculosis* comprises 13 genes clustered on a 50-kb fragment of the chromosome. The region is the biggest operon in the genome of *M. tuberculosis* (Camacho, et al. 2001; Camacho, et al. 1999; Cox, et al. 1999; Trivedi, et al. 2005).

In *M. tuberculosis*, phoP (744 bp) maps upstream of phoR (1458 bp) and both genes are transcribed in the same direction. Replacement of the generated 94-bp deletion within the phoP gene by the residual res site entails the presence of multiple STOP codons that on the other hand results in lack of translation of the DNA binding domain (equivalent to 92 amino acids) of PhoP in MTBVAC.

The deletions in phoP and fadD26 genes in MTBVAC can be detected/localized using a RT-PCR presence/absence approach. The method uses fluorescent-based PCR reagents (primers and probes) to indicate the presence of the res sites in ΔphoP and ΔfadD26 genes and absence of the wild-type phoP and fadD26 genes.

Herein below, we provide the open-reading frame (ORF) sequence of fadD26 gene in Mt103 a) and in MTBVAC (ΔfadD26) b); and the ORF sequence of phoP gene in Mt103 c) and in MTBVAC (ΔphoP) d). The nucleotide sequence corresponding to the deleted gene regions in fadD26 (a) and phoP (c) are depicted in small letters; residual res site is highlighted in grey. For the fluorescent-based PCR detection method, primers for each target are underlined and the TAQMAN® probe is shown in bold.

a)
wild-type fadD26 gene in Mt103
SEQ ID NO 1

ATGCCGGTGACCGACCGTTCAGTGCCCTCTTTGCT

GCAAGAGAGGGCCGACCAGCAGCCTGACAGCACTG

CATATACGTACATCGACTACGGATCCgaccccaag ggatttgctgacagcttgacttggtcgcaggtcta cagtcgtgcatgcatcattgctgaagaactcaagt tatgcgggttacccggagatcgagtggcggtttta gcgccacaaggactggaatatgtccttgcattcct gggcgcacttcaggctggatttatcgcggttccgc tgtcaactccacagtatggcattcacgatgaccgc gtttctgcggtgttgcaggattccaagccggtagc cattctcacgacttcgtccgtggtaggcgatgtaa cgaaatacgcagccagccacgacgggcagcctgcc ccggtcgtagttgaggttgatctgcttgatttgga ctcgccgcgacagatgccggctttctctcgtcagc acaccggggcggcttatctccaatacacgtccgga tcgacgcgtacgccggccggagtcattgtgtcgca cacgaatgtcattgccaatgtgacacaaagtatgt acggctatttcggcgatcccgcaaagattccgacc gggactgtggtgtcgtggctgcctttgtatcacga tatgggcctgattctcggaatttgcgcaccgctgg tggcccgacgccgcgcgatgttgatgagcccaatg tcatttttgcgccgtccggcccgctggatgcaact gcttgccaccagcggccggtgcttttctgcggcac cgaatttcgccttcgagctggccgtgcgcagaaca tctgaccaggacatggcggggctcgacctgcgcga cgtggtcggcatcgtcagtggcagtgagcgaatcc atgtggcaaccgtgcggcggttcatcgagcggttc gcgccgtacaatctcagccccaccgcgatacggcc gtcgtacgggctcgcggaagogaccttatatgtgg cagctcccgaagccggcgccgcgcccaagacggtc cgttttgactacgagcagctgaccgccgggcaggc -continued tcggccctgcggaaccgatgggtcggtcggcaccg aactgatcagctacggctcccccgacccatcgtct gtgcgaatcgtcaacccggagaccatggttgagaa tccgcctggagtggtcggtgagatctgggtgcatg gcgaccacgtgactatggggtattggcagaagccg aagcagaccgcgcaggtcttcgacgccaagctggt cgatcccgcgccggcagccccggaggggccgtggc tgcgcaccggcgacctgggcgtcatttccgatggt gagctgttcatcatgggccgcatcaaagacctgct catcgtggacgggcgcaaccactaccccgacgaca tcgaggcaacgatccaggagatcaccggtggacgg gccgcggcgatcgcagtgcccgacgacatcaccga acaactggtggogatcatcgaattcaagcgacgcg gtagtaccgccgaagaggtcatgctcaagctccgc tcggtgaagcgtgaggtcacctccgcGATATCGAA

GTCACACAGCCTGCGGGTGGCCGATCTCGTTCTGG

TGTCACCTGGTTCGATTCCCATCACCACCAGCGGC

AAGATCCGGCGGTCAGCCTGCGTCGAACGCTATCG

CAGCGACGGCTTCAAGCGGCTGGACGTAGCCGTAT

GA.

ΔfadD26 in MTBVAC
b)
SEQ ID NO 2

ATGCCGGTGACCGACCGTTCAGTGCCCTCTTTGCT

GCAAGAGAGGGCCGACCAGCAGCCTGACAGCACTG

CATATACGTACATCGACTACGGATCCACTAGTTCT

AGAGCAACCGTCCGAAATATTATAAATTATCGCAC

ACATAAAAACAGTGCTGTTAATGTGTCTATTAAAT

CGATTTTTTGTTATAACAGACACTGCTTGTCCGAT

ATTTGATTTAGGATACATTITTATGAGATCCCCCG

GGCTGCAGGAATTCGATATCGAAGTCACACAGCCT

GCGGGTGGCCGATCTCGTTCTGGTGTCACCTGGTT

CGATTCCCATCACCACCAGCGGCAAGATCCGGCGG

TCAGCCTGCGTCGAACGCTATCGCAGCGACGGCTT

CAAGCGGCTGGACGTAGCCGTATGA.

c)
wild-type phoP gene in Mt103
SEQ ID NO 3

ATGCGGAAAGGGGTTGATCTCGTGACGGCGGGAAC

CCCAGGCGAAAACACCACACCGGAGGCTCGTGTCC

TCGTGGTCGATGATGAGGCCAACATCGTTGAACTG

CTGTCGGTGAGCCTCAAGTTCCAGGGCTTTGAAGT

CTACACCGCGACCAACGGGGCACAGGCGCTGGATC

GGGCCCGGGAAACCCGGCCGGACGCGGTGATCCTC

```
GATGTGATGATGCCCGGGATGGACGGCTTTGGGGT

GCTGCGCCGGCTGCGCGCCGACGGCATCGATGCCC

CGGCGTTGTTCCTGACGGCCCGTGACTCGCTACAG

GACAAGATCGCGGGTCTGACCCTGGGTGGTGACGA

CTATGTGACAAAGCCCTTCAGTTTGGAGGAGGTCG

TGGCCAGGCTGCGGGTCATCCTGCGACGCGCGGGC

AAGGGCAACAAGGAACCACGTAATGTTCGACTGAC

GTTCGCCGATatcgagctcgacgaggagacccacg aagtgtggaaggcgggccaaccggtgtcgctgtcg cccaccgaattcaccctgctgcgctatttcgtGAT

CAACGCGGGCACCGTGCTGAGCAAGCCTAAGATTC

TCGACCACGTTTGGCGCTACGACTTCGGTGGTGAT

GTCAACGTCGTCGAGTCCTACGTGTCGTATCTGCG

CCGCAAGATCGACACTGGGGAGAAGCGGCTGCTGC

ACACGCTGCGCGGGGTGGGCTACGTACTGCGGGAG

CCTCGATGA.

d)
ΔphoP in MTBVAC
                                    SEQ ID NO 4
ATGCGGAAAGGGGTTGATCTCGTGACGGCGGGAAC

CCCAGGCGAAAACACCACACCGGAGGCTCGTGTCC

TCGTGGTCGATGATGAGGCCAACATCGTTGAACTG

CTGTCGGTGAGCCTCAAGTTCCAGGGCTTTGAAGT

CTACACCGCGACCAACGGGGCACAGGCGCTGGATC

GGGCCCGGGAAACCCGGCCGGACGCGGTGATCCTC

GATGTGATGATGCCCGGGATGGACGGCTTTGGGGT

GCTGCGCCGGCTGCGCGCCGACGGCATCGATGCCC

CGGCGTTGTTCCTGACGGCCCGTGACTCGCTACAG

GACAAGATCGCGGGTCTGACCCTGGGTGGTGACGA

CTATGTGACAAAGCCCTTCAGTTTGGAGGAGGTCG

TGGCCAGGCTGCGGGTCATCCTGCGACGCGCGGGC

AAGGGCAACAAGGAACCACGTAATGTTCGACTGAC

GTTCGCCGATATCGAATTCCTGCAGCCCGGGGAT

CTCATAAAAATGTATCCTAAATCAAATATCGGACA

AGCAGTGTCTGTTATAACAAAAAATCGATTTAATA

GACACATTAACAGCACTGTITTTATGTGTGCGATA

ATTTATAATATTTCGGACGGTTGCTCTAGAACTAG

TGGATCAACGCGGGCACCGTGCTGAGCAAGCCTAA

GATTCTCGACCACGTTTGGCGCTACGACTTCGGTG

GTGATGTCAACGTCGTCGAGTCCTACGTGTCGTAT

CTGCGCCGCAAGATCGACACTGGGGAGAAGCGGCT

GCTGCACACGCTGCGCGGGGTGGGCTACGTACTGC

GGGAGCCTCGATGA.
```

SO2 has a thorough and complete preclinical history demonstrating robust safety and attenuation profile and promising efficacy compared to BCG in relevant animal models. Fortunately, most of these preclinical studies have been reproduced with MTBVAC to confirm functional profile and biological activity of the double attenuating PhoP-PDIM-phenotype. Lipid profile analyses have demonstrated that MTBVAC and its prototype SO2 are phenotypically comparable lacking DAT, PAT, and PDIM.

On the other hand, from hereinafter in the context of the present invention, BCG will be used to refer to the current vaccine that has been in use against tuberculosis since 1921. It is a live attenuated vaccine derived from a *M. bovis* strain that lost its virulence after being sub-cultured in the laboratory and which we now know has more than one hundred deleted genes. (Behr, M. A. Lancet Infect Dis 2002; 2(2): 86-92.)

From hereinafter in the context of the present invention, H37Rv will be used to refer to a pathogenic *M. tuberculosis* strain that has been sequenced, Cole et al. referring to these genes as Rv (Ref Cole et al 1998 Deciphering the biology of *M. tuberculosis* from the complete genome sequence. Nature 393: 537-544).

From hereinafter in the context of the present invention Mt103 will be used to refer to a *M. tuberculosis* clinical isolate. (Camacho et al. Mol Microbiol 1999; 34: 257-267.) From hereinafter in the context of the present invention PDIM– strain will be used to refer to the strain of the *M. tuberculosis* complex that is not capable of synthesizing phthiocerol dimycocerosates, which are important lipids related to the pathogenicity of *M. tuberculosis*.

From hereinafter in the context of the present invention *M. tuberculosis* phoP– will be used to refer to the *M. tuberculosis* strain that has been inactivated by the Rv0757 gene deletion between the EcoRV-BspEI sites, its phenotype being PhoP– PDIM+.

From hereinafter in the context of the present invention Rv2930 (fadD26) will be used to refer to the gene that is at the beginning of the operon that is responsible for the synthesis of phthiocerol dimycocerosates (PDIM) (Camacho et al.) and the elimination of this gene in *M. tuberculosis* that confers a stable PDIM– phenotype.

DESCRIPTION

Data available in the literature evidences a primary role of lung innate cells in the development of asthma. Concretely, macrophages that are alternatively activated, or type M2, are elevated in lungs from asthmatic individuals, both in animal models and humans. Reasons behind this pathological macrophage polarization are not clear. A plausible explanation is that allergens can directly cause damage in the alveolar epithelium, and macrophages are alternatively activated as a reaction to the injury, to induce a wound-healing response (Murray P J, Wynn T A. Protective and pathogenic functions of macrophage subsets. Nat Rev Immunol 2011; 11:723-37). M2 is a simplified terminology that encloses different subsets of macrophages with regulatory skills. Thus, three different types of M2 macrophages have been defined, M2a, M2b and M2c, each one with its own peculiarities. In the particular case of M2a macrophages, their presence has been linked with an induction of Th2 adaptive response (Saradna A, Do D C, Kumar S, Fu Q L, Gao P. Macrophage polarization and allergic asthma. Transl Res 2018; 191:1-14). With regard to allergic asthma, M2a macrophages can contribute to trigger the allergen-specific T cell response at least in two different ways. First, since once activated they express high levels of MHC-II molecules they can present allergen-derived peptides to T lymphocytes, and second, they secrete cytokines such as IL-4 which drive T cell response polarization towards a Th2 profile (von Bubnoff D, Geiger E, Bieber T. Antigen-presenting cells in allergy. J Allergy Clin Immunol 2001; 108:329-39). Thus, as exacerbated M2 macrophage activation seems to be important in the asthmatic inflammatory response, this represents a highly attractive opportunity to design novel immunomodulatory treatments that targets this misbalance in lung macrophage populations.

Figure 3:
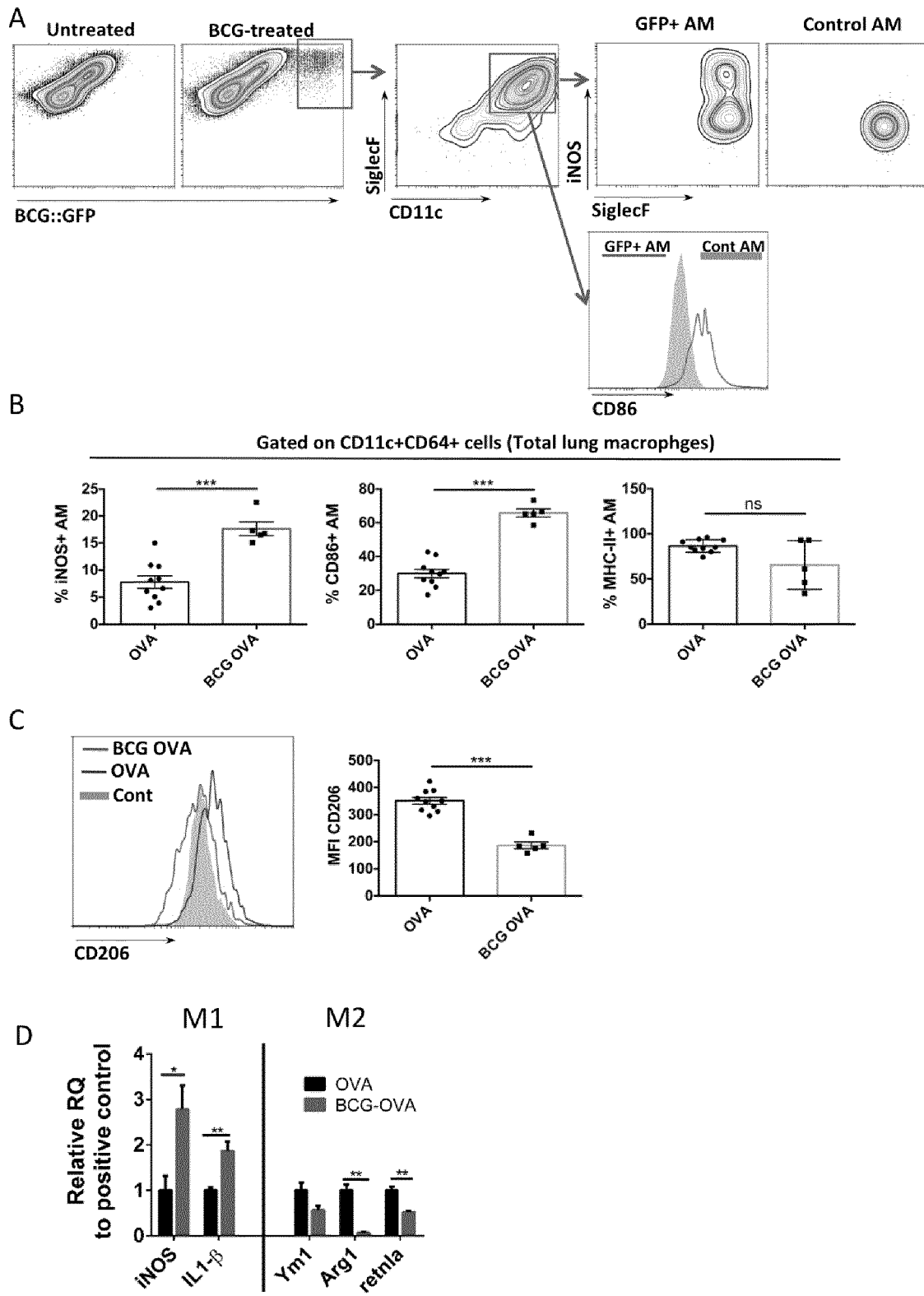
FIG. 3. BCG intranasal infects lung resident macrophages and induces classical activation. (A) Groups of mice were immunized with $10^6$ CFU of GFP-expressing BCG. One month later, infected cells were monitored and characterized by flow cytometry. Expression of M1-polarization markers iNOS and CD86 was analyzed. Representative diagrams are shown in the figure. (B) Percentage of iNOS-, CD86- and MHC-positive alveolar macrophages in OVA-challenged untreated or BCG-treated. (C) Surface expression of the M2-activation marker CD206. Representative overlay histogram showing CD206 surface expression of indicated experimental groups. Graph shows comparison of Mean Fluorescence Intensity (MFI) corresponding to CD206 level of expression. (D) M1 and M2 activation markers measured by qRT-PCR in lungs from OVA-challenged mice, untreated or BCG-treated. Data in the graphs are representative mean±SEM from two independent experiments (B,C) or one (D). A minimum of 6 mice was used per group and experiment. $*p<0.05$; $p<0.01$; $*p<0.001$; by unpaired single (B,C) or multiple (D) t-student test.

In the present invention, we have evaluated the therapeutic potential of live attenuated tuberculosis vaccines delivered by the intranasal route in different preclinical models of asthma. Our results are highly robust. Intranasal BCG and MTBVAC reverts asthma-associated responsiveness in all the situations tested, both in short-term and long-term acute models, induced by different allergens, and even in an scenario of established asthma (FIG. 1, 2, 6, 7). Our data clearly indicate that BCG and MTBVAC impair M2 macrophages associated to allergen exposure (FIG. 3, 5). A likely mechanism behind this inhibition might rest on the capacity of the vaccines to activate macrophages in a classical way (or M1 phenotype), probably due to their natural intracellular status. Thus, BCG and MTBVAC are efficiently internalized by alveolar macrophages upon immunization, leading to the expression of markers like iNOS, and secretion of cytokines as IL-1β, TNFα and IL-12, which creates an inflammatory response antagonist generated by alternatively activated macrophages. Importantly, our analysis with GFP-expressing BCG bacteria indicates that not only infected macrophages adopt an M1 phenotype, but also uninfected cells. These suggest that macrophages initially infected generate a chain of signals that activates also bystander neighbors, favoring the expansion of a response that counterbalance asthma-associated environment.

BCG-associated benefits for asthma patients have been extensively studied in the clinic, both in observational studies comparing asthma prevalence among BCG vaccinated populations (Sarinho E, Schor D, Veloso M, Lima M. BCG scar diameter and asthma: a case-control study. J Allergy Clin Immunol 2000; 106:1199-200), and in interventional studies where two arms are vaccinated with BCG or placebo and asthma symptoms reported and compared between both groups (Choi I S, Koh Y I. Therapeutic effects of BCG vaccination in adult asthmatic patients: a randomized, controlled trial. Ann Allergy Asthma Immunol 2002; 88:584-91). Data are controversial, with studies showing opposite findings. A report comparing different published studies using meta-analysis suggested some years ago that there is not an evident association between BCG intradermal vaccination and low risk to develop asthma (Arnoldussen D L, Linehan M, Sheikh A. BCG vaccination and allergy: a systematic review and meta-analysis. J Allergy Clin Immunol 2011; 127:246-53, 53 el-21). A plausible hypothesis to explain this apparent discordance between the clinic and our data could be that the beneficial effect of BCG is organ dependent, and therefore BCG needs to be physically present in the lungs to induce an efficient anti-asthma response. Indeed, subcutaneous BCG is not protective against asthma in mouse (Lagranderie M, Abolhassani M, Vanoirbeek J, Lefort J, Nahori M A, Lapa ESJR, et al. *Mycobacterium bovis* BCG killed by extended freeze-drying reduces airway hyperresponsiveness in 2 animal models. J Allergy Clin Immunol 2008; 121:471-8), a result that we have confirmed with MTBVAC. This should be apparently expected according to our observation that BCG must interact with lung resident macrophages to reshape their activation phenotype. Searching in the literature, there are interesting data that could endorse this hypothesis. Unlike the results reported with BCG, data showing lower prevalence of asthma among tuberculosis-infected people seem to be more robust. In this regard, it has been found that there is a significant correlation between lower prevalence of asthma and TB notification cases (von Mutius E, Pearce N, Beasley R, Cheng S, von Ehrenstein O, Bjorksten B, et al. International patterns of tuberculosis and the prevalence of symptoms of asthma, rhinitis, and eczema. Thorax 2000; 55:449-53). A study conducted in latent-TB infected individuals (LTBI) demonstrated a strong association between tuberculosis skin test (TST) positivity and lower prevalence of different types of allergy. Interestingly, in the case of asthma, authors found a substantial reduction in asthma incidence in the group with the highest TST value, suggesting a correlation between magnitude of the TB-specific immune response and degree of unspecific protection (Obihara C C, Kimpen J L, Gie R P, Lill S W, Hoekstra M O, Marais B J, et al. *M. tuberculosis* infection may protect against allergy in a tuberculosis endemic area. Clin Exp Allergy 2006; 36:70-6). Noteworthy, we have recently demonstrated protection against asthma in tuberculosis-infected mice (Tarancón R, Uranga S, Martin C, Aguiló N. *Mycobacterium tuberculosis* infection prevents asthma and abrogates eosinophilopoiesis in an experimental model Allergy. 2019 May 22. doi: 10.1111/all.13923). Since *M. tuberculosis* infection is usually acquired by the respiratory route (whereas BCG is given intradermally), we could conclude that our results with pulmonary delivered live attenuated vaccines might be reflecting a natural unspecific protection that already occurs in the nature.

Figure 4:
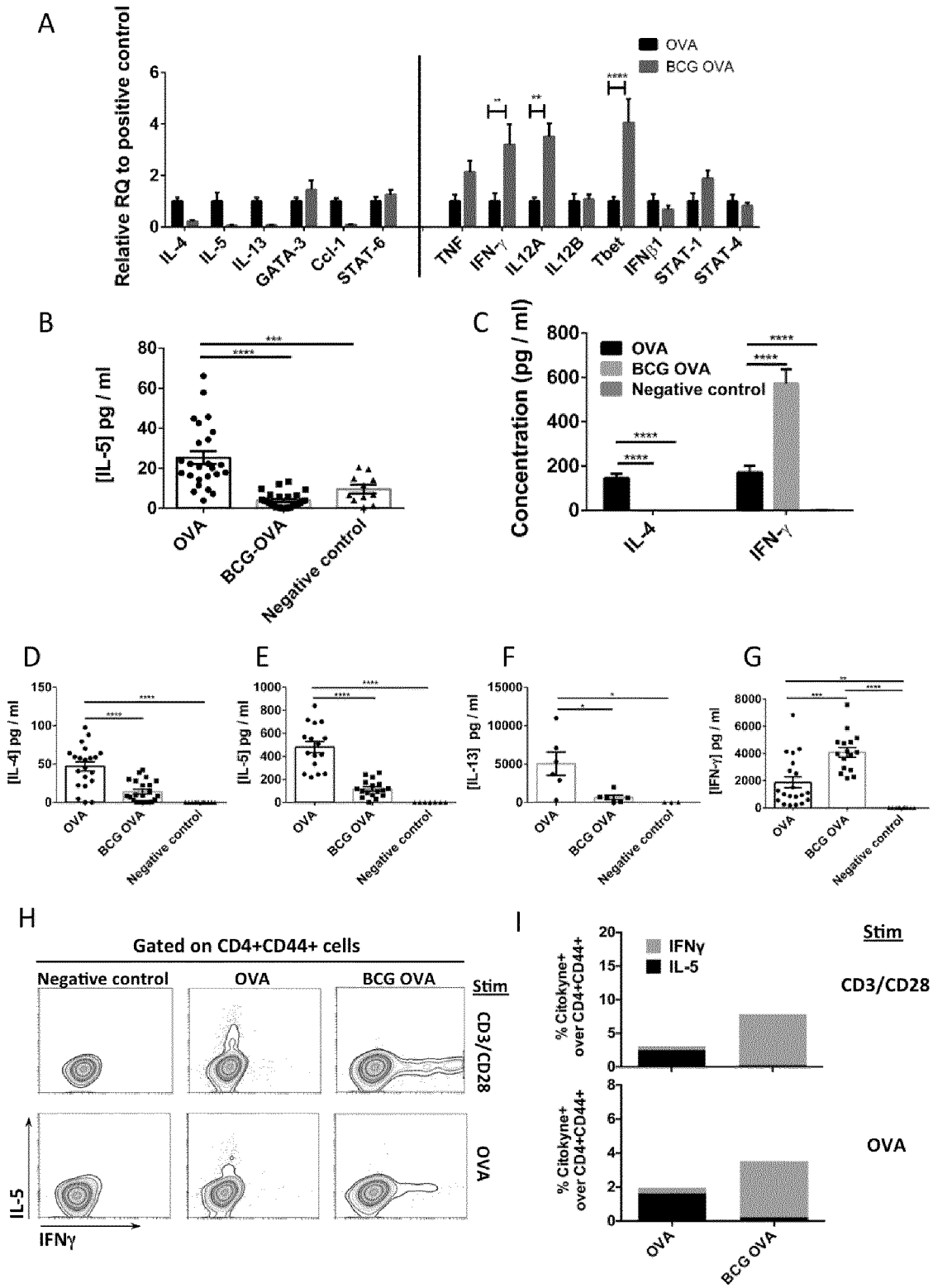
FIG. 4. BCG intranasal reshapes allergen-specific response into a Th1 profile. (A) Th1 and Th2 activation markers measured by qRT-PCR in lungs from OVA-challenged mice, untreated or treated with BCG one week after sensitization. (B) IL-5 determination in BAL. (C) IL-4 and IFNγ determination in lung explants (D-G) Allergen-specific IL-4, IL-5, IL-13 and IFNγ produced by mediastinal lymph node cells, following ex vivo stimulation with OVA. Each point corresponds to the subtraction of the value obtained in the presence of OVA minus the value without allergen. (H,I) IL-5- and IFNγ-producing cells visualized by intracellular staining and flow cytometry following ex vivo stimulation with anti CD3/CD28 or with OVA. Representative diagrams are shown. Data in the graphs are pooled means±SEM from three independent experiments (B-E, G) or one (A,I). A minimum of 6 mice was used per group and experiment. $*p<0.05$; $p<0.01$; $*p<0.001$; $****p<0.0001$, by multiple t-student test (A), one-way ANOVA with Bonferroni post-test (B, D-G), and two-way ANOVA with Bonferroni post-test (C, I).

Allergen-specific CD4+ T cells are thought to play a central role in asthma inflammation. Use of allergen-MHC-II tetramers has allowed characterization of allergen-specific CD4+ T cells in asthmatic individuals, finding tetramer-positive T cell clones that express central memory markers (Kwok W W, Roti M, Delong J H, Tan V, Wambre E, James E A, et al. Direct ex vivo analysis of allergen-specific CD4+ T cells. J Allergy Clin Immunol 2010; 125:1407-9 e1). These long-lived T cells are ultimately responsible of the perpetuation of asthma throughout lifetime. Upon allergen exposure, specific memory CD4+ T cells migrate to lungs where they efficiently recognize allergen-derived peptides presented by APCs, and respond quickly by secreting Th2-associated cytokines leading to asthma inflammatory response. Thus, a therapy that pursues asthma mitigation should focus on hampering allergen-specific Th2 memory cells. For instance, immunotherapy based on low-level allergen epitope exposure works by inducing anergy on allergen-specific Th2 T cells (O'Hehir R E, Prickett S R, Rolland J M. T Cell Epitope Peptide Therapy for Allergic Diseases. Curr Allergy Asthma Rep 2016; 16:14). Our results analyzing OVA-specific T cells in draining lymph nodes indicate that intranasal BCG and MTBVAC has a strong impact in OVA-specific Th2 cells (FIG. 4, 5). Intracellular staining and flow cytometry, which allows direct visualization of cytokine-producing cells, showed a population of IL-5-producing T cells in the OVA group that is clearly diminished upon BCG treatment, as long as a population of OVA-specific IFNγ-producing cells arises (FIG. 4H,I). This suggests that live mycobacteria could reshape phenotype of the T cells involved in asthma responsiveness.

During the last years, novel experimental immunotherapies against asthma have emerged, mainly based on the blockade of specific pathways that contribute to asthma-induced inflammation, such as IL-4, IL-5, Il-13 or IgE, showing in many cases positive results. However, these studies also evidence that efficacy achieved by inhibition of a single pathway results in general partial. For instance, IL-5-specific therapy substantially inhibits eosinophilia, whereas outcomes for other measures, such as lung function, are less favorable (Pavord I D, Korn S, Howarth P, Bleecker E R, Buhl R, Keene O N, et al. Mepolizumab for severe eosinophilic asthma (DREAM): a multicenter, double-blind, placebo-controlled trial. Lancet 2012; 380:651-9). Since asthma is a highly complex disease, we speculate that a more global approach as the proposed in the present study could be more efficient dealing with the different aspects of the pathology.

MTBVAC is a novel tuberculosis vaccine that has been demonstrated to be safe in human neonates and adults by the intradermal route. The results presented herein, indicate the MTBVAC intranasal ability to revert asthma-associated inflammatory response. Thus, pulmonary MTBVAC might represent an attractive approach for allergic asthma, with some advantages with regard to BCG, these advantages are briefly summarized below.

First of all, data from clinical trials indicate a lower reactogenicity of intradermal MTBVAC compared to BCG (Spertini F, Audran R, Chakour R, Karoui O, Steiner-Monard V, Thierry A C, et al. Safety of human immunization with a live-attenuated *M. tuberculosis* vaccine: a randomized, double-blind, controlled phase I trial. Lancet Respir Med 2015; 3:953-62), which could be related with the more efficient clearance observed in the present invention. Remarkably, MTBVAC has been demonstrated to be fully susceptible to current tuberculosis antibiotics, unlike BCG that is resistant to isoniazid and pyrazinamide.

Secondly, as already discussed above, a plausible hypothesis to explain our findings is that the beneficial effect of BCG and MTVBAC is organ dependent, and therefore both need to be physically present in the lungs to induce an efficient anti-asthma response. Therapeutic efficacy against asthma must be thus induced by pulmonary delivery. Through pulmonary route, the drug can be administered by two primary modes: first, intranasal administration, which has anatomical limitation, such as narrower airway lumen, second, oral inhalative administration. By oral inhalative administration far better results can be expected as it allows administering very small particles with a concentration loss of only 20% in comparison with 85% by nasal route. Oral inhalative administration can again be classified as intratracheal instillation and intratracheal inhalation. The most common method used in laboratory is the intratracheal instillation. In the intratracheal instillation, a small amount of drug solution or dispersion is delivered into the lungs by a special syringe. This provides a fast and quantifiable method of drug delivery to the lungs. The localized drug deposition is achieved with a comparatively small absorptive area. So, the installation process is much simple, non-expensive, and has non-uniform drug distribution. In preclinical animal studies, intratracheal instillation has frequently been used to assess the pulmonary absorption and systemic bioavailability, especially with regard to the precise dosing and effectiveness associated with this method. However, intratracheal instillation is not a physiological route for application, and results obtained from these studies may not be transferable to aerosol applications in humans. On the contrary, inhalation method uses aerosol technique by which we can get more uniform distribution with great penetration.

Figure 8:
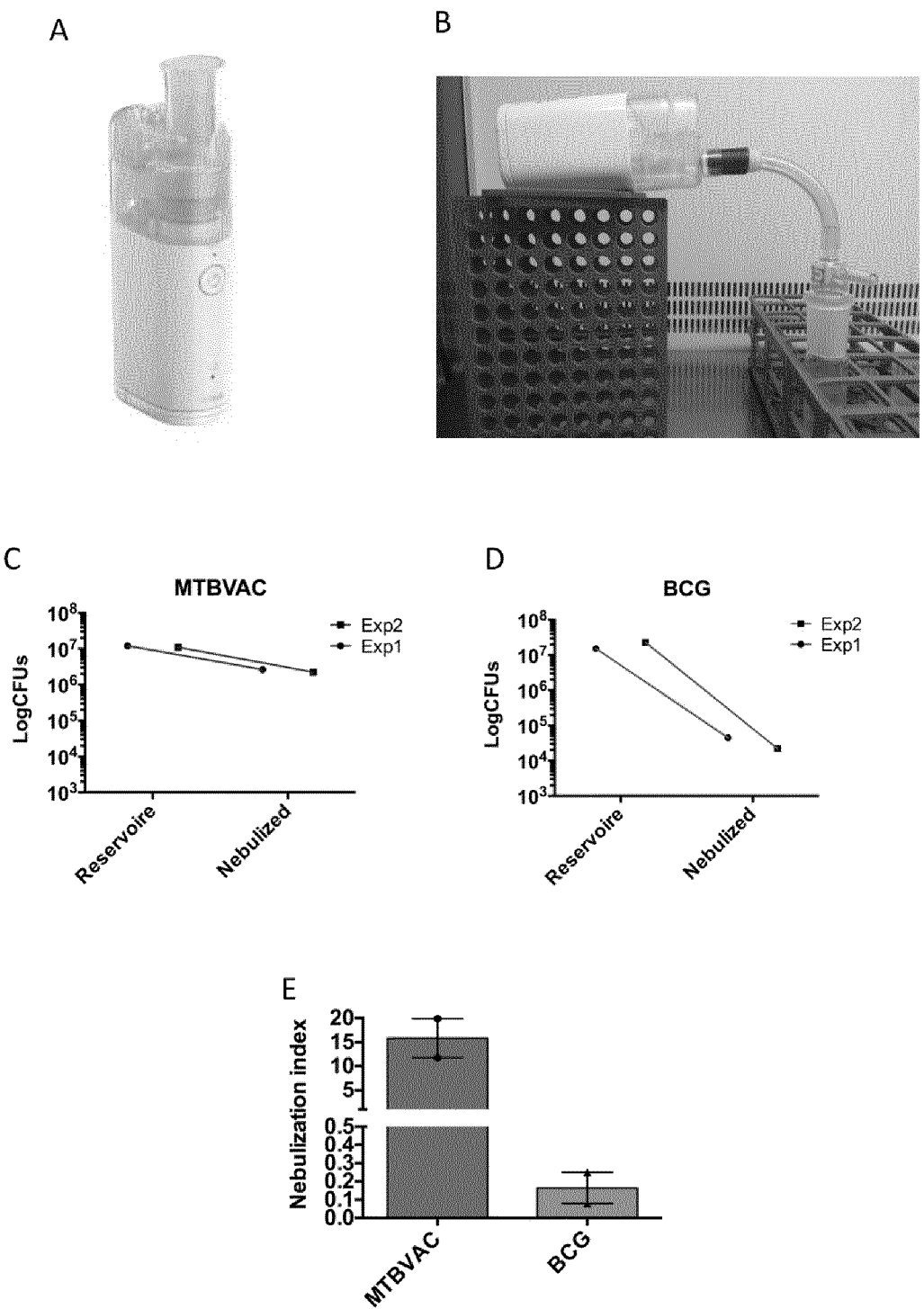
FIG. 8. MTBVAC is more efficiently nebulized than BCG in a clinical nebulizer. MTBVAC and BCG were nebulized using the clinical device OMRON® U100 (A) and recovered in a gas washing flask in a known volume of sterile water (B). (C, D) Loss of CFUs in nebulized fraction compared to reservoir for MTBVAC (C) and BCG (D) in two independent experiments. (E) Nebulization efficacy index calculated as the % of bacteria recovered in the nebulized fraction compared to the initially available in the GMP formulation.

In the present invention, we have thus evaluated the nebulization efficacy of BCG and MTBVAC using the aerosol nebulizer device OMRON® U100 (FIG. 8A), used in clinic for drug pulmonary delivery. This should be the optimal via of administration of live attenuated vaccines in clinic that could not only prevent asthmatic inflammatory response, but also reverts it, and therefore it could have a potential therapeutic application to be administered in human patients. FIG. 8 shows that MTBVAC is more efficiently nebulized than BCG in this clinical nebulizer. BCG and MTBVAC GMP lots tested in the study contained $1.7\times10^7$ and $1.1\times10^7$ CFUs/ml, respectively. After 5 minutes of nebulization, the amount of bacteria recovered were $1.98\times10^6$ CFUs for MTBVAC (FIG. 8C) and $3.3\times10^4$ CFUs for BCG (FIG. 8D). Mean nebulization efficacy index from two independent experiments, calculated as the % of bacteria recovered in the nebulized fraction compared to the initially available in the reservoir, were 15% and 0.15% for MTBVAC and BCG, respectively (FIG. 8E).

Figure 2:
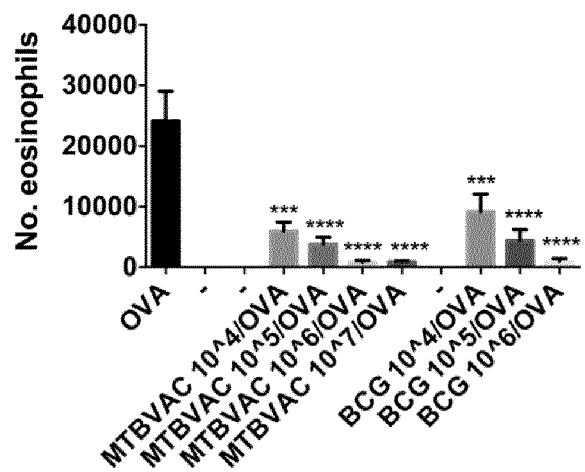
FIG. 2. Therapeutic effect of BCG and MTBVAC over lung eosinophilia is dose dependent. Vaccine dose-response profile was assessed in the acute model of OVA-induced asthma described in FIG. 1. Different doses of vaccination with MTBVAC and BCG were compared with the untreated OVA positive control. A dose-response effect is observed when comparing the different doses of vaccination, demonstrating a lower eosinophilia when the vaccination dose increases, both in MTBVAC and BCG. Data in the graphs are mean±SEM from one independent experiment (n=6 mice per group). $*p<0.05$; $p<0.01$; $*p<0.001$; $****p<0.0001$, by two-way ANOVA with Dunn post-test analysis comparing each group with OVA challenged mice. It is noted that, both BCG and MTBVAC reduce eosinophilia in BAL (FIG. 2A) and lungs (FIG. 2B) in a dose dependent way. Reduction in the BAL is total with doses of $10^6$ CFUs in both cases, whereas in lungs, eosinophil reduction up to negative control levels is reached with the highest doses tested ($10^7$ CFU for MTBVAC and $10^6$ for BCG).
Figure 2:
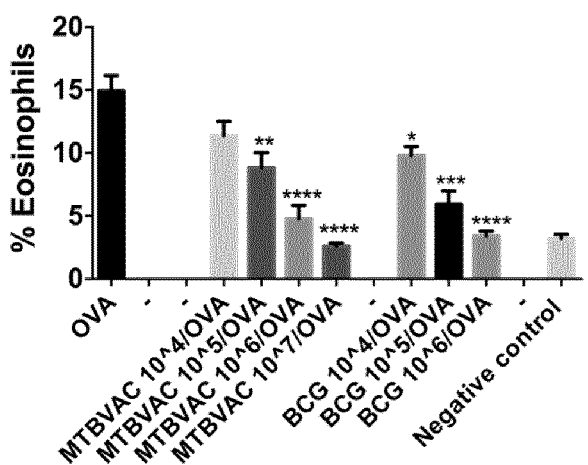

Importantly, our data shown in FIG. 2 indicated that therapeutic effect of BCG and MTBVAC over allergen-induced eosinophilia had a strong component of dose dependence, and therefore it is crucial that a certain critical dose of vaccine reaches the lungs to reduce eosinophil infiltration. Looking the results from FIG. 2, we could consider that $10^6$ CFUs would be an optimal therapeutic dose for both vaccines.

Considering the data obtained from the nebulization studies under the experimental conditions established, this dose could only been obtained with MTBVAC, whereas with the BCG formulation utilized we only nebulized around 3% of this optimal dose of bacteria. We thus can conclude that using the inhalation method by aerosol with a clinical device, a therapeutic dose of MTBVAC can be achieved whereas with BCG such therapeutic dose is not achieved.

Figure 9:
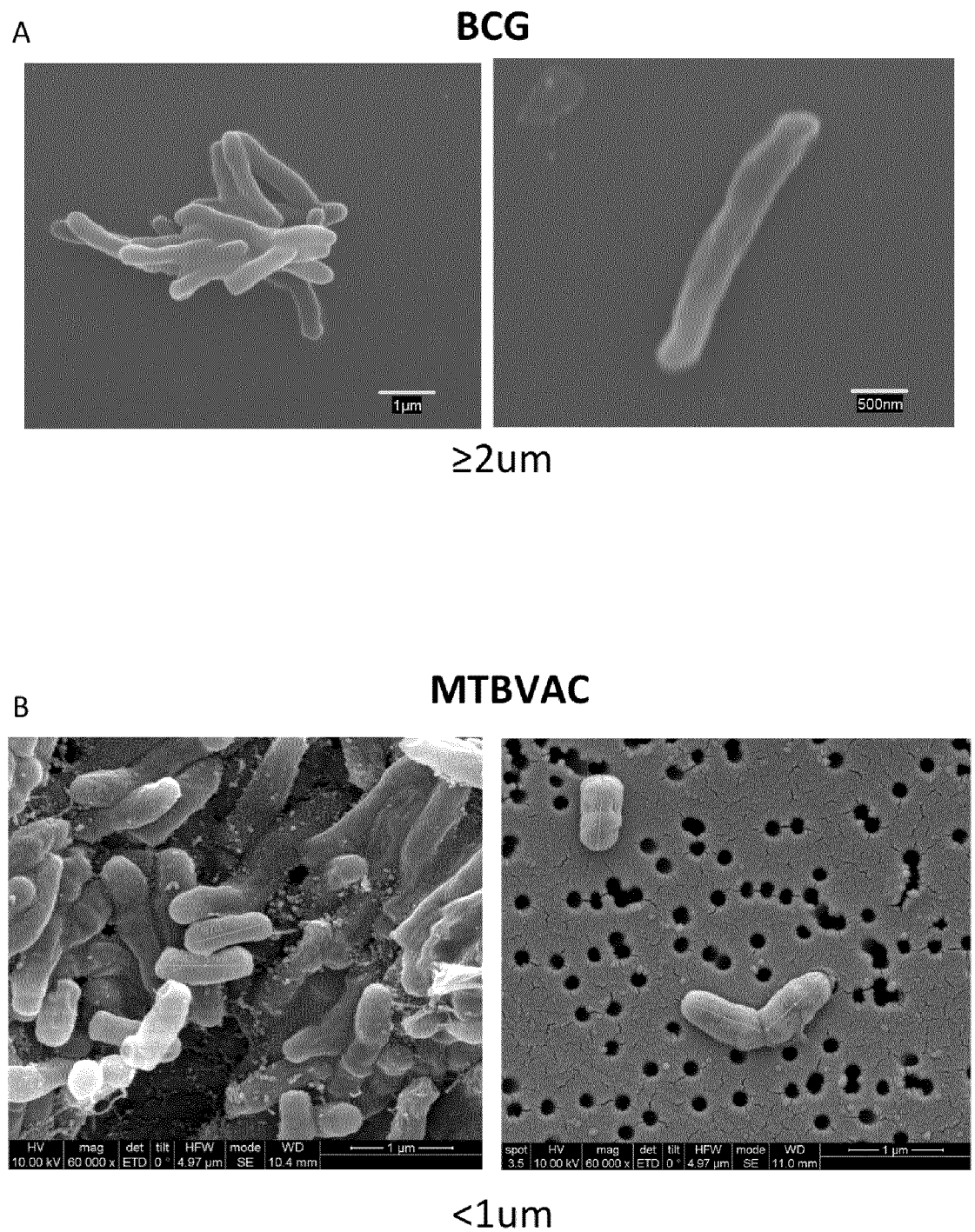
FIG. 9. MTBVAC size is smaller than BCG Representative electronic microscope images for BCG (A) and MTB-VAC (B) are shown in the figure.

These differences could be explained with the different sizes of BCG and MTBVAC observed in electron microscope images (FIG. 9). MTBVAC bacilli are shorter than 1 micrometer, whereas BCG is longer than 2 µm. In addition, our observations in the laboratory indicate that BCG presents a higher tendency to form clumps than MTBVAC, when vaccines are culture in the absence of detergents (as for industrial production). Since the mean aerosol particle size of clinical nebulizers is in general around 5 micrometers, we consider that these two factors: bacterial size and clumping, could explain the differences in nebulization efficacy between BCG and MTBVAC.

Figure 10:
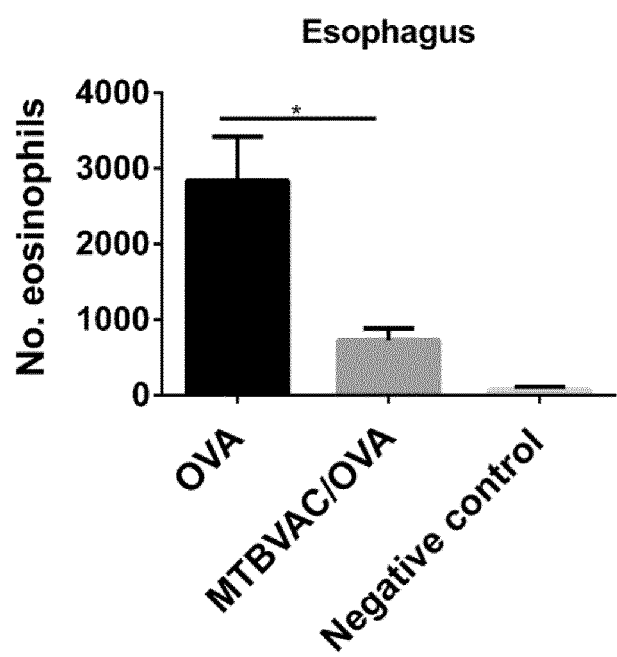
FIG. 10. MTBVAC reduces eosinophilia in the esophagus. Eosinophils in the esophagus were determined in an acute model of OVA-induced asthma with a group treated with MTBVAC. Treatment with intranasal MTBVAC significantly reduced the eosinophilia. Graphs are mean±SEM from pooled data from two independent experiment (n=6 mice per group and experiment). *p<0.05 by one-way ANOVA with Bonferroni post-test.

Our results also showed that in the OVA-acute asthma model there is also an infiltration of eosinophils in the esophagus, a situation that is prevented when MTBVAC is administered intranasally (FIG. 10). These data suggest that live attenuated mycobacteria could be also used to treat other types of pathogenic eosinophilia, like Eosinophilic esophagitis (EoE), in addition to allergic asthma.

The present invention describes for the first time the therapeutic efficacy against asthma induced by pulmonary delivery of live attenuated MTBVAC mycobacteria by subverting the pulmonary immune environment, preferably when MTBVAC is administered through the pulmonary route by an inhalation method using an aerosol technique. Moreover, the present invention additionally describes, in FIG. 11, that the MTBVAC pulmonary delivery improves protection against tuberculosis compared with BCG deliver by the canonical subcutaneous route.

Consequently, a first aspect of the invention refers to a live-attenuated *M. tuberculosis* composition (composition of the present invention) comprising an isolated microorganism belonging to a *M. tuberculosis* MTBVAC strain having a i) PhoP– phenotype by inactivation by a genetic deletion of the Rv0757 gene, wherein the open-reading frame (ORF) sequence of phoP consists of SEQ ID NO:4, and ii) the deletion of a second gene, Rv2930 (fadD26), that prevents PDIM production (PDIM– phenotype), wherein the open-reading frame (ORF) sequence of fadD26 consists of SEQ ID NO:2, for use in therapy in a human subject in need thereof, wherein the composition is administered to said subject via pulmonary delivery. Preferably, said composition is administered to said subject via pulmonary delivery by an inhalation method using an aerosol technique.

Preferably, the composition of the first aspect of the invention, is a lyophilized composition which further comprises certain components (e.g., particular stabilizers, bulking agents, and buffers) that have been found to be advantageous in the preparation of lyophilized MTBVAC strains vaccines. The invention also relates to reconstituted vaccines, and prophylactic and therapeutic methods employing the composition described in the first aspect of the invention, as long as said composition is administered to said subject via pulmonary delivery preferably by an inhalation method using an aerosol technique. The compositions and methods of the invention are described further, as follows.

In a preferred embodiment of the first aspect of the invention or of any of its preferred embodiments, said composition is characterized in that it comprises at least between $10^5$ cfu and $10^6$ cfu strains of the isolated microorganism. More preferably, the composition comprises between $10^6$ cfu and $10^7$ cfu strains of the isolated microorganism.

In a second aspect of the invention, the vaccine compositions of the first aspect of the invention can be administered through the pulmonary route, preferably by an inhalation method using an aerosol technique, as primary prophylactic agents to those at risk of infection with *M. tuberculosis* or those at risk of developing tuberculosis disease, or can be used as secondary agents for treating infected patients. Because the strains of these compositions are attenuated, they are particularly well suited for administration to "at risk individuals" such as newborns, children, adolescents, adults, and elderly. Such vaccines can also be used in veterinary contexts.

In a third aspect of the invention, the vaccine compositions of the first aspect of the invention can be administered through the pulmonary route, preferably by an inhalation method using an aerosol technique, as prophylactic agents to those at risk of suffering from an allergic reaction, preferably as prophylactic agents targeting M2 macrophages to alleviate allergic responsiveness, more preferably as prophylactic agents to those at risk of suffering from asthma, specifically allergic asthma, or those at risk of developing asthma, specifically allergic asthma; or can be used as agents for treating patients with an allergic reaction, preferably by targeting M2 macrophages to alleviate allergic responsiveness, more preferably for treating asthma, specifically allergic asthma. Because the strains of these compositions are attenuated, they are particularly well suited for administration to "at risk individuals" such as newborns, children, adolescents, adults, and elderly. Such vaccines can also be used in veterinary contexts.

A preferred embodiment of the second aspect of the invention relates to the compositions of the first aspect of the invention for immunizing an individual against the symptoms caused by tuberculosis. It is noted that said vaccine may be also suitable for the treatment of bladder cancer as well as for the treatment or prevention of TB, or as a vector or adjuvant. Preferably, the compositions may be used to immunize an individual against the symptoms caused by TB.

In another preferred embodiment of the second aspect of the invention, the composition of the first aspect is administered for prophylaxis in neonates at risk of infection with *M. tuberculosis* or those at risk of developing TB disease, against infections caused by *M. tuberculosis* complex, preferably *M. tuberculosis*.

In another preferred embodiment of the second aspect of the invention, the composition of the first aspect is administered for prophylaxis or prevention (including booster vaccination) in non-neonate humans, such as children, adolescents and adults at risk of infection with *M. tuberculosis*, against infections caused by *M. tuberculosis* complex, preferably *M. tuberculosis*.

In another preferred embodiment of the second aspect of the invention, the composition of the first aspect is administered for prophylaxis or prevention in non-neonate humans, such as children, adolescents and adults at risk of developing TB disease and suffering from latent tuberculosis infection, against the development of the clinical symptomatology associated with the active form of the disease caused by *M. tuberculosis* complex, preferably *M. tuberculosis*.

In another preferred embodiment of the second aspect of the invention, the composition of the first aspect is administered for use as a secondary agent for treating patients infected with latent and/or active TB in neonates and non-neonate humans, such as children, adolescents and adults.

In another preferred embodiment of the second aspect of the invention, the composition of the first aspect is administered for booster vaccination or booster dose in a prophylactic or preventive treatment in non-neonate humans, such as children, adolescents and adults at risk of infection with *M. tuberculosis*, against infections caused by *M. tuberculosis* complex, preferably *M. tuberculosis*. In this sense, it is noted that after initial immunization, a booster injection or booster dose is a re-exposure to the immunizing antigen. It is intended to increase immunity against that antigen back to protective levels, after memory against that antigen has declined through time.

Throughout the description and claims the word "comprise" and its variants do not imply the exclusion of other technical characteristics, additives, components or steps. For a person skilled in the art, other objects, advantages and characteristics of the invention will arise partly out of the description and partly when the invention is put into practice. The following examples and figures are provided by way of a non-limiting, illustrative example of the present invention.

EXAMPLES

Methods

Bacteria

BCG Danish SSI (Pfizer), BCG Pasteur (strain 1173P2, Institut Pasteur Paris, France), MTBVAC (University of Zaragoza) strains were grown at 37° C. in Middlebrook 7H9 broth (Difco) supplemented with ADC 10% (Difco) and 0.05% (v/v) Tween-80 (Sigma), or on solid Middlebrook 7H11 (Difco) supplemented with ADC 10%. BCG Pasteur and MTBVAC were transformed with the replicative pJKD6 plasmid encoding green fluorescent protein (GFP) (a kind gift from Luciana Leite, Butantan Institute, Brazil). Bacterial suspensions for vaccination were prepared in PBS from glycerol stocks previously quantified by plating serial dilutions. For bacterial quantification, bacterial suspensions were serial diluted and plated onto agar medium 7H10 supplemented with ADC.

Animal Studies

All mice were kept under controlled conditions and observed for any sign of disease. Experimental work was conducted in agreement with European and national directives for protection of experimental animals and with approval from the Ethics Committee from University of Zaragoza (protocol PI22/15).

For induction of OVA-specific asthma, 8-to-10 weeks old female C57BL/6 (Janvier Biolabs) were sensitized by intraperitoneal injections of 50 µg chicken egg ovalbumin (lyophilized powder, ≥98% (Sigma)) with 2 mg aluminum hydroxide (Sigma, St. Louis, MO) twice one week apart. One week later mice were intranasally immunized with $10^6$ CFU of the indicated vaccine in 40 µl of PBS. In the acute model, four weeks after vaccine administration, animals were intranasally challenged with 100 µg OVA in sterile PBS for 3 consecutive days, and the day after they were humanely sacrificed. In the chronic model, three weeks after immunization, mice were intranasally challenged with 10 µg OVA twice per week during eight weeks. In this case, vaccines were administered at week 9 of the procedure, in the half of the challenge phase. For HDM-induced chronic asthma, mice were intranasally challenged twice a week for three consecutive weeks with 10 µg HDM. Vaccines were delivered at week 4, and one month later intranasally challenged with 10 µg HDM for three consecutive days. The day after the animals were sacrificed.

For bronchoalveolar lavage (BAL) collection, trachea was cannulated and BAL performed with 0.8 ml of ice-cold PBS. Supernatant was separated from cells by centrifugation 5 min at 4500×g.

Lungs were removed aseptically. For obtaining cellular suspensions, they were added to HEPES buffer (HEPES 10 mM; NaCl 0.15 M; KCl 5 mM; MgCl2 1 mM; CaCl$_2$) 1.8 mM pH 7.4) containing collagenase D 100 mg/ml (Roche) and DNAseI 400 IU (AppliChem), incubated at 37° C. for 30 minutes, and homogenized using GentleMACS® (Miltenyi Biotech) dissociator with the lung specific program according to manufacturer instructions. Afterwards, residual red blood cells were lysed using Red Blood Cells Lysing Buffer (Sigma). In the case of histological analysis, lungs were fixed with formaldehyde 40% for 24 hours prior to staining procedure.

Mediastinal lymph nodes were removed aseptically and mechanically disrupted for cell collection before being filtered to eliminate tissue remnant.

Esophagus were removed aseptically and crosswise cut. Then, they were added to 2 ml HEPES buffer (HEPES 10 mM; NaCl 0.15 M; KCl 5 mM; MgCl2 1 mM; CaCl2 1.8 mM pH 7.4) containing collagenase D 100 mg/ml (Roche) and DNAseI 400 IU (AppliChem), incubated at 37° C. for 30 minutes, and homogenized. Afterwards, the homogenized esophagus was filtered to eliminate tissue remnant.

Flow Cytometry Analysis $10^6$ lung or BAL cells were incubated for 15 minutes at 4° C. with Fc receptor blocking reagent (Miltenyi Biotech). Then, eosinophil, neutrophil and macrophage presence was determined by extracellular staining with the following antibodies: CD45-FITC, siglecF-APC, Ly-6G-Vioblue®, from Miltenyi Biotech; and CD11c-PE, CD11b-PerCP/Cy5.5, from BD Biosciences. Eosinophils were defined as $SSC^{high}CD45^+CD11b^+SiglecF^+CD11c^-$; neutrophils as $CD45^+Ly6G^+CD11b^+CD11c^-$; and Alveolar Macrophages as $CD45^+SiglecF^+CD11c^+CD11b^{dim}$ cells.

For intracellular staining (ICS), after labelling membrane proteins with the antibodies mentioned above, in addition to MHCII-Vioblue® (Miltenyi), and CD206-APC and CD86-PE (BD Biosciences), cells were fixed and permeabilized with the FoxP3 staining set (Miltenyi Biotech), according to manufacturer instructions. As intracellular antibodies we used iNOS-APC and iNOS-PE (Miltenyi), and Arg1-APC (eBiosciences). Cells were acquired using a Gallios flow cytometer (Beckman Coulter) and analyzed with Weasel software.

Cytokine Analysis

Quantification of IL-5, IL-4, IL-13 and IFN-γ was performed using specific commercial ELISA kits following manufacturer instructions (Mabtech Biotech). Cytokine determination in the lungs was done from organ explants. These were prepared by cutting the lung into small pieces and incubating them overnight at 37° C. in 0.5 ml of culture medium.

To analyze OVA or HDM specific response, mediastinal lymph nodes were removed aseptically and mechanically disrupted for cell collection. 2×$10^6$ cells were incubated with or without OVA 1 mg/ml or HDM 10 ug/ml for 96 hours. Then, supernatant was collected to determine cytokine concentration. OVA-specific response for each cytokine was calculated as the difference between cytokine concentration obtained following OVA stimulation minus the unstimulated control. For ICS, cells were incubated with 1 mg/ml OVA or 1 µg/ml of anti CD3/CD28 (BD Biosciences) for 24 hours, and 10 µg/ml Brefeldin A (Sigma) was added during the last six hours. For surface staining, cells were labelled with anti-CD4-FITC (BD Biosciences) and anti-CD3-PerCP-Vio® 700 (Miltenyi Biotec), in culture medium with 10% FCS. Then, cells were fixed and permeabilized with the Cytofix/Cytoperm® Fixation/Permeabilization Kit (BD Biosciences) following manufacturer instructions, and stained with anti-IFNγ-APC (BD Biosciences) and anti-IL5-PE (Miltenyi Biotech).

qRT-PCR

For RNA extraction, lungs were immersed into TRIzol® reagent (Invitrogen) just upon harvesting, and frozen immediately with dry ice. Once thawed, lungs were homogenized with the GentleMACS®, using the RNA 0.2 protocol. 200 µl of chloroform were added per ml of TRIzol® and after vigorous vortexing, tubes were centrifuged at 18,000×g for one hour at 4° C. Aqueous upper phase containing eukaryotic RNA was recovered, added to 700 µl of isopropanol and centrifuged at 18,000×g during 10 minutes at 4° C. The resulting pellet was washed with 70% EtOH and stored at −20° C. Residual DNA was eliminated by DNAse treatment, RNA was purified with an extraction based on phenol-acid-chloroform and precipitated overnight at −20° C. with isopropanol and sodium acetate. cDNA libraries were constructed for gene expression analysis by RT-qPCR. Primer pairs used in the present study were the following:

| Actin | 5'-ACCAGTTCGCCATGGAT GAC (SEQ ID NO: 5) | 5'-TGCCGGAGCCGTTGTC (SEQ ID NO: 6) |
|---|---|---|
| 18S | 5'-TTCGTATTGCGCCGCTA GA (SEQ ID NO: 7) | 5'-CTTTCGCTCTGGTCCGT CTT (SEQ ID NO: 8) |

-continued

| | | | |
|---|---|---|---|
| Gata3 | 5'-GACCCGAAACCGGAAGA TGT (SEQ ID NO: 9) | | 5'-GCGCGTCATGCACCTTT T (SEQ ID NO: 10) |
| Il12a | 5'-ACGCAGCACTTCAGAAT CACA (SEQ ID NO: 11) | | 5'-CACCAGCATGCCCTTGT CTA (SEQ ID NO: 12) |
| Il12b | 5'-TGGAGCACTCCCCATTC CT (SEQ ID NO: 13) | | 5'-TGCGCTGGATTCGAACA A (SEQ ID NO: 14) |
| Ifng | 5'-TTGGCTTTGCAGCTCTT CCT (SEQ ID NO: 15) | | 5'-TGACTGTGCCGTGGCAG TA (SEQ ID NO: 16) |
| Il5 | 5'TTGACAAGCAATGAGACG ATGAG (SEQ ID NO: 17) | | 5'-TCCAATGCATAGCTGGT GATTT (SEQ ID NO: 18) |
| Il4 | 5'-GGAGATGGATGTGCCAA ACG (SEQ ID NO: 19) | | 5'-CGAGCTCACTCTCTGTG GTGTT (SEQ ID NO: 20) |
| Il13 | 5'-TTGAGGAGCTGAGCAAC ATCAC (SEQ ID NO: 21) | | 5'-CCATGCTGCCGTTGCA (SEQ ID NO: 22) |
| Stat1 | 5'-CTCTGGAATGATGGGTG CATT (SEQ ID NO: 23) | | 5'-TTGAGCAGAGCGCGTTC TC (SEQ ID NO: 24) |
| Stat4 | 5'-CATTTGCAACCCAAGGA GATG (SEQ ID NO: 25) | | 5'-TGGCAGCCCTCGTTTCC (SEQ ID NO: 26) |
| Stat6 | 5'-AACTGCAACGGCTCTAT GTTGA (SEQ ID NO: 27) | | 5'-AGCCAGTCAGCCAGGAG ATG (SEQ ID NO: 28) |
| Tnf | 5'-CAGCCGATGGGTTGTAC CTT (SEQ ID NO: 29) | | 5'-GGCAGCCTTGTCCCTTG A (SEQ ID NO: 30) |
| T Bet | 5'-ACCTGTTGTGGTCCAAG TTCAA (SEQ ID NO: 31) | | 5'-GCCGTCCTTGCTTAGTG ATGA (SEQ ID NO: 32) |
| Ifnb1 | 5'-CCCTATGGAGATGACGG AGAAG (SEQ ID NO: 33) | | 5'-GAGCATCTCTTGGATGG CAAA (SEQ ID NO: 34) |
| Ccl11 | 5'-GACCAGGTTGGGCAAAG AGA (SEQ ID NO: 35) | | 5'-GGCATCCTGGACCCACT TCT (SEQ ID NO: 36) |
| Ym1 | 5'-GTCTGGCCCCTGGACAT G (SEQ ID NO: 37) | | 5'AGAGGGAAATGTCTCTGG TGACA (SEQ ID NO: 38) |
| Il1b | 5'-AGTTGACGGACCCCAAA AGA (SEQ ID NO: 39) | | 5'-GGACAGCCCAGGTCAAA GG (SEQ ID NO: 40) |
| Retnla | 5'-CAGCTGATGGTCCCAGT GAA (SEQ ID NO: 41) | | 5'TTCCTTGACCTTATTCTC CACGAT (SEQ ID NO: 42) |
| Nos2 | 5'-GGATCTTCCCAGGCAAC CA (SEQ ID NO: 43) | | 5'-TCCACAACTCGCTCCAA GATT (SEQ ID NO: 44) |
| arg1 | 5'-GCTCCAAGCCAAAGTCC TTAGA (SEQ ID NO: 45) | | 5'-CCTCGAGGCTGTCCTTT TGA (SEQ ID NO: 46) |

Nebulization Studies

MTBVAC and BCG produced under GMP conditions were resuspended in 1 ml per vial and placed in the reservoir of the clinical nebulizer U100 (OMRON®). Nebulizer was connected with a plastic tube to a gas washing flask with 5 ml of sterile water, coupled with a vacuum pump to recover the nebulized fraction. Bacteria were nebulized for 5 minutes and both nebulized and reservoir fractions were plated in solid agar 7H10 medium supplemented with ADC. Nebulization efficacy index were calculated as:

$$\frac{\text{Bacteria nebulized fraction}}{\text{Bacteria reservoir fraction}} \times 100$$

Statistics

Commercial mice were randomly distributed in groups of 6 animals per cage prior to start experimental procedures. Results were not blinded for analysis. No statistical method was used to calculate sample size in animal experiments. GraphPad Prism® software was used for statistical analysis. Statistical tests used for each experiment are indicated in the figure legends. All statistical tests used were two-tailed. Outlier values were determined applying the Grubb's test to all data sets, and discarded from the final statistical analysis. Differences were considered as significant for p value $<0.05$.

Example 1

In an acute model of OVA-driving asthma (FIG. 1A) and determining lung eosinophilia by flow cytometry (FIG. 1B), MTBVAC (FIG. 1C) and BCG (FIG. 1D) vaccines administered intranasally over sensitized mice dramatically reduces allergen-induced percentage of eosinophilia to levels comparable to negative controls, both in BAL and lungs. This decrease is also observed when analyzed total number of eosinophils, without profoundly affecting other cellular populations (FIG. 1E, F). Effect of vaccine treatment is also observed when analyzed mucus secretion and lung epithelium remodeling, as observed by staining with PAS technique. BCG-treated mice show much lower presence of goblet cells and mucosubstances, as well as a lower rate of epithelium proliferation (FIG. 1G).

Example 2

Both BCG and MTBVAC reduce eosinophilia in BAL (FIG. 2A) and lungs (FIG. 2B) in a dose dependent way. Reduction in the BAL is total with doses of $10^6$ CFUs in both cases, whereas in lungs, eosinophil reduction up to negative control levels is reached with the highest doses tested ($10^7$ CFU for MTBVAC and $10^6$ for BCG).

Example 3

BCG mainly infects alveolar macrophages. BCG internalization led to the expression of M1 polarization markers, as iNOS or CD86 (FIG. 3A). In addition, BCG infection upregulates M1 markers (iNOS or CD86) and downregulate M2 markers (CD206) in the total lung macrophage population (FIG. 3B, C). M1 repolarization of macrophages induced by BCG is confirmed studying lung gene expression of M1 markers iNOS and IL1b (higher in BCG group) and M2 markers Ym1, Arg1 and retnla (lower in BCG group) (FIG. 3D).

Example 4

BCG intranasal administration rebalances allergen-induced Th2 response towards a Th1 phenotype. BCG vaccination induces Th1-associated genes as Ifng, 1112a, or the transcription factor Tbet. Conversely, genes codifying for typical Th2 cytokines and chemokines, such as IL-5, IL-4, IL-13 or CCL-1, are down modulated by BCG (FIG. 4A). In consonance with these results, IL-5 and IL-4 cytokines are elevated in BAL and lungs respectively in the OVA group, whereas IFNγ is increased when vaccinated with BCG (FIG. 4B, C).

These changes are reproduced when studied allergen-specific T cells after ex vivo OVA stimulation of harvested lymphocytes from mediastinal lymph nodes. Data show a higher IL-4, IL-5 and IL-13, and lower IFNγ OVA-specific production in the OVA group compared to BCG-vaccinated mice (FIG. 4D-G). Using intracellular staining and flow cytometry, we directly visualize cytokine-producing CD4+ CD44+ T cells, which would correspond with a memory phenotype. Both following stimulation with CD3/CD28 or with OVA, T cell response polarization is found to be opposite between both groups. Remarkably OVA-specific IL-5-producing cells are diminished in the mice treated with BCG (FIG. 4H-I).

Example 5

Figure 5:
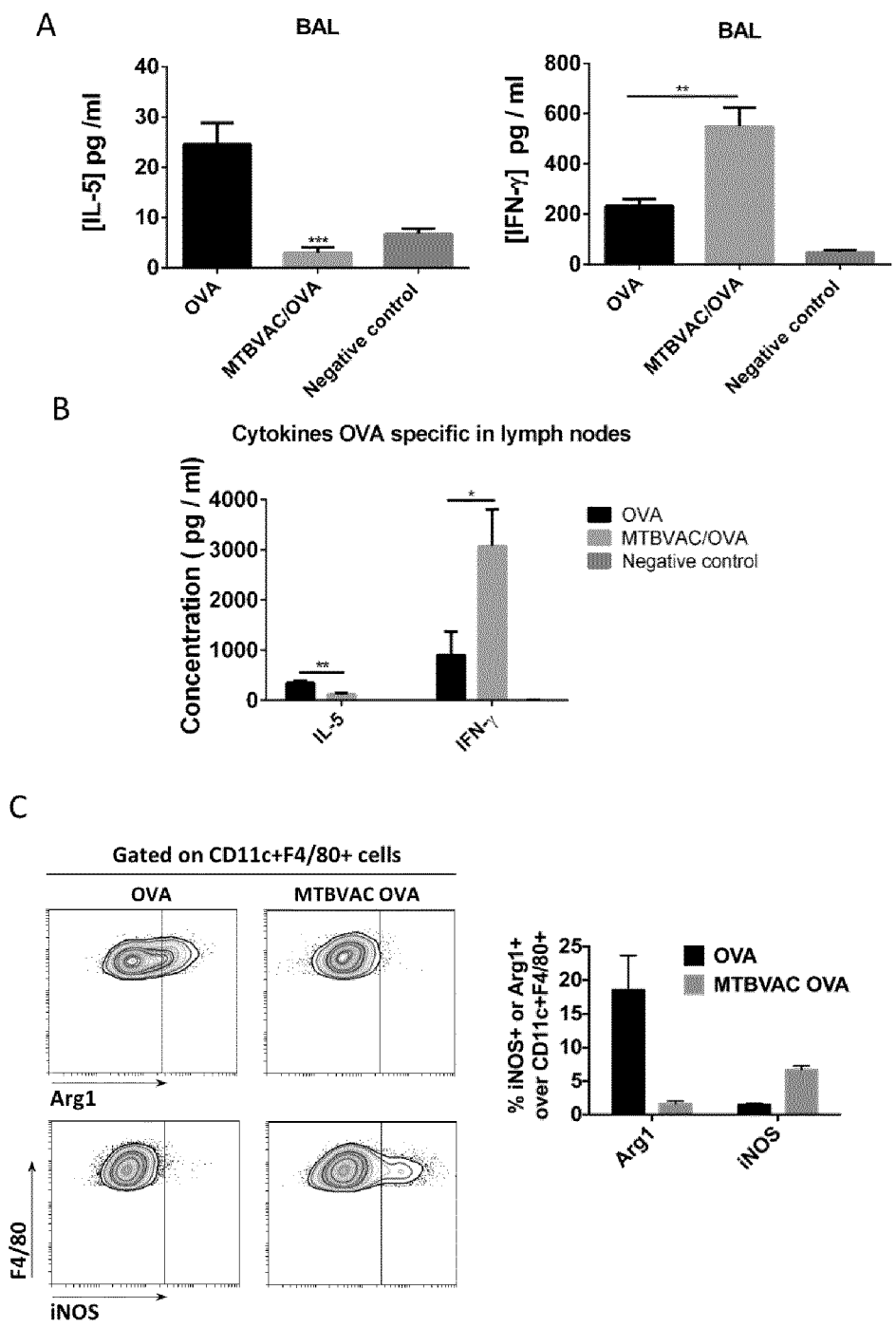
FIG. 5. Modulation of the immune response by MTBVAC. Th2 vs Th1 response were analyzed in a model of allergic acute asthma. IL-5 and IFNγ– were analyzed in bronchoalveolar lavage (BAL) (A) and lymph nodes (B) as representative cytokines of Th2 and Th1 responses, respectively. (C) iNOS and Arg1 were analyzed in lung macrophages as representative molecules of M2 and M1 macrophage polarization responses, respectively. MTBVAC intranasal treatment reverted Th2 and M2 asthma-associated responses into Th1 and M1. Data in the graphs are mean±SEM from one independent experiment (n=6 mice per group). $*p<0.05$; $p<0.01$; $*p<0.001$ by one-way ANOVA with Bonferroni post-test (A), and two-way ANOVA with Bonferroni post-test (B).

MTBVAC treatment leads to a decrease of Th2 cytokine IL-5 and an increase of the Th1 marker IFNγ– in BAL from OVA-challenged mice (FIG. 5A), as well as in lymph node cells stimulated ex vivo with OVA (FIG. 5B). MTBVAC administration abrogates expression of the M2 marker Arg1 in lung macrophages, whereas it induces expression of M1 marker iNOS (FIG. 5C).

Example 6

Figure 6:
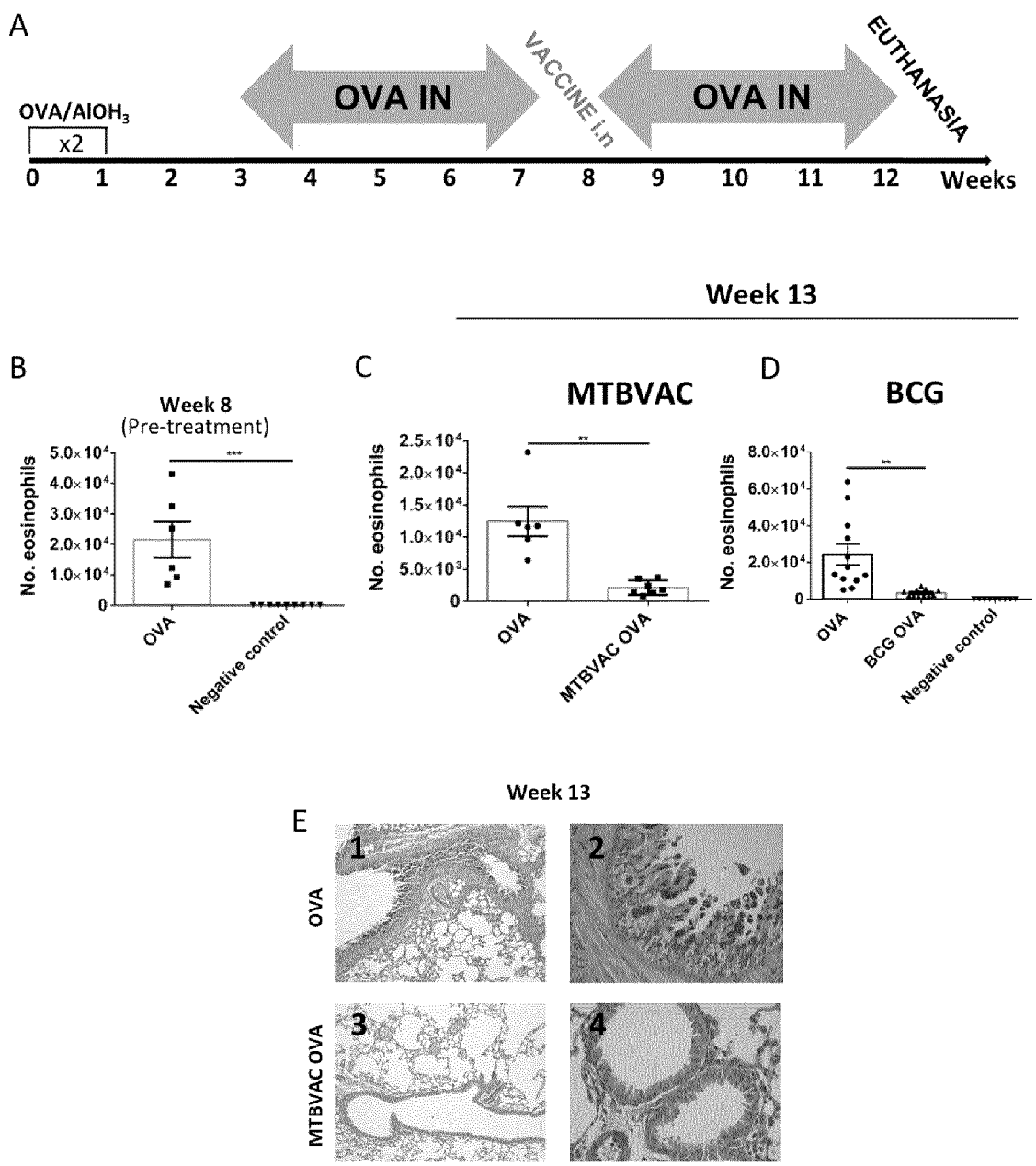
FIG. 6. BCG and MTBVAC intranasal revert established allergic airway responsiveness. (A) Scheme of the experiment based on an OVA-induced chronic model. Mice were challenged from week 3 to 13 with two weekly intranasal inoculations of OVA 10 µg. Vaccines were delivered at week 9, in the half of the challenge phase. (B) Total number of eosinophils in BAL at week 8, the week before vaccine immunization. This demonstrated the presence of established eosinophilia prior to vaccine administration (C) Total number of eosinophils in BAL at week 13, four weeks after MTBVAC or BCG treatment. (E) Representative images of PAS-stained fixed lungs from OVA-challenged mice untreated or MTBVAC-treated. Data in the graphs are mean±SEM from a representative experiment of at least two independent experiments. A minimum of 6 mice was used per group and experiment. $*p<0.05$; $p<0.01$; $*p<0.001$, by t-student test (B,C), one-way ANOVA with Bonferroni post-test (D).

MTBVAC and BCG abrogates established eosinophilia in a chronic model of OVA-driving asthma (FIG. 6A). Vaccines administered to OVA-challenged mice, in a situation where eosinophils are already infiltrated into the respiratory airways (FIG. 6B), reduced eosinophilia to levels comparable to negative control (FIG. 6C, D). Effect of vaccine treatment is also observed when analyzed mucus secretion and lung epithelium remodeling, as observed by staining with PAS technique. BCG-treated mice show much lower presence of goblet cells and mucosubstances, as well as a lower rate of epithelium proliferation (FIG. 6E).

Example 7

Figure 7:
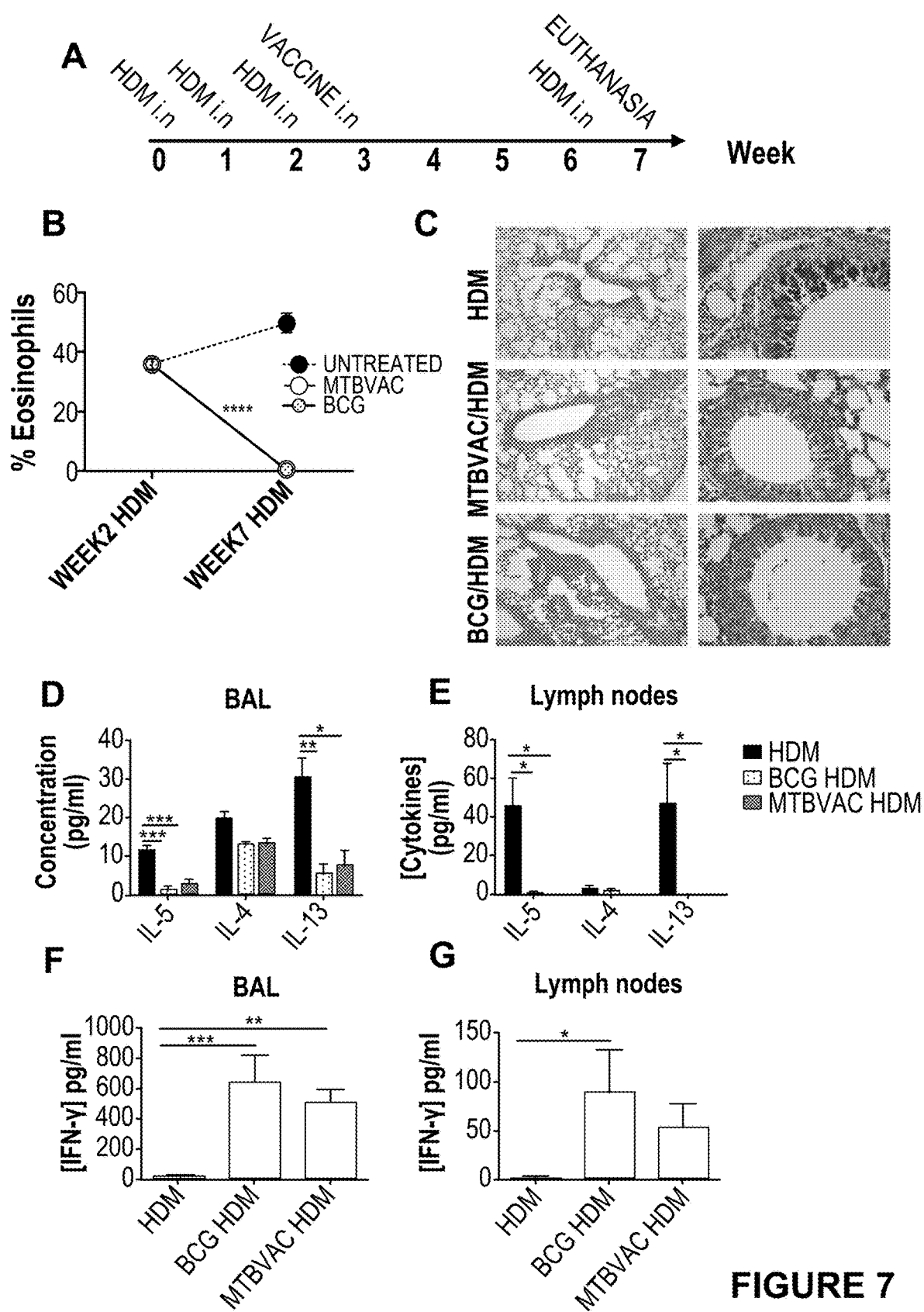
FIG. 7. MTBVAC reverts asthma-associated phenotype in a model of established asthma induced by the relevant allergen House-dust mite (HDM). (A) Scheme of the HDM-induced chronic model. Mice were intranasally challenged twice a week for three consecutive weeks with 10 µg HDM. Vaccines were delivered at week 4, and one month later intranasally challenged with 10 µg HDM for three consecutive days. The day after animals were sacrificed (B) Eosinophil were determined in BAL in an additional group sacrificed at week 3, confirming presence of eosinophilia at the time when vaccines were administered. The graph shows the comparison of the eosinophil percentage in BAL between week 3 and week 7 in untreated or BCG-, MTBVAC-treated mice (C). Lung remodeling and mucus secretion was assessed by PAS staining and histological evaluation. Representative images are shown in the figure (D, E) Th2 cytokines IL-5, IL-4 and IL-13 were analyzed in BAL, and in lymph nodes following ex vivo stimulation with HDM. (F, G) Th1 cytokine IFNγ– was analyzed in BAL, and in lymph nodes following ex vivo stimulation with HDM. Data in the graphs are mean±SEM from one independent experiment (n=6 mice per group). *p<0.05; p<0.01; *p<0.001 by one-way ANOVA with Bonferroni post-test (A, F, G), and two-way ANOVA with Bonferroni post-test (D, E).

MTBVAC and BCG abrogates established eosinophilia in a chronic model of asthma induced by the physiological allergen House-dust mite (HDM) (FIG. 7A). Vaccines administered over HDM-challenged mice, in a situation where eosinophils are already infiltrated into the respiratory airways, dramatically reduced eosinophilia to levels comparable to negative control (FIG. 7B). Effect of vaccine treatment is also observed when analyzing mucus secretion and lung epithelium remodeling, as observed by staining with PAS technique. BCG-treated mice show much lower presence of goblet cells and mucosubstances, as well as a lower rate of epithelium proliferation (FIG. 7C).

MTBVAC and BCG intranasal administration rebalances HDM-induced Th2 response towards a Th1 phenotype. Th2 cytokines IL-5, IL-4 and IL-13 are reduced in the vaccine-treated groups both in BAL and lymph node cells stimulated with the allergen (FIG. 7D, E). Conversely, MTBVAC and BCG increased levels of the Th1 cytokine IFNγ– (FIG. 7F, G).

Example 8

Vaccine nebulization in the clinical aerosol device OMRON® U100 (FIG. 8A, B) demonstrates a substantially higher nebulization efficacy of MTBVAC compared to BCG. Approximately, 15% of MTBVAC bacteria placed initially in the nebulizer reservoir are aerosolized, whereas this percentage drops to a 0.15% in the case of BCG (FIG. 8C-E). This indicates that by using aerosol as pulmonary route of vaccine administration, it will be more feasible to reach a therapeutic dose in the lungs with MTBVAC than with BCG. Electron microscope images of BCG and MTBVAC demonstrates a lower size of MTBVAC (FIG. 9A, B), which could explain the differences in nebulization efficacy observed.

Example 9

Intranasal MTBVAC reduced eosinophilia in the esophagus induced by OVA challenge (FIG. 10). This result suggest that live attenuated vaccines could be used as treatment for other types of eosinophilia in addition to allergic asthma, like Eosinophilic Esophagitis (EoE).

Example 10

Figure 11:
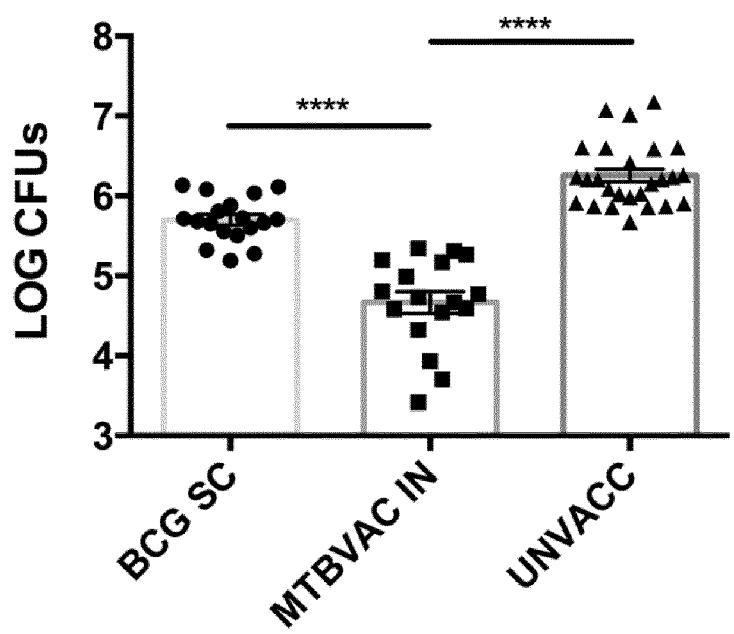
FIG. 11. MTBVAC intranasal improves protection against tuberculosis compared with BCG deliver by the canonical subcutaneous route. Mice were vaccinated with BCG by the subcutaneous route (comparable to the intradermal, that is used in clinic), or MTBVAC by intranasal. Two months later mice were intranasally challenged with a low dose of the *M. tuberculosis* strain H37Rv, and four weeks later bacterial burden was determined in lungs. Graphs are mean±SEM from pooled data from four independent experiment (n=6 mice per group and experiment). ****p<0.00001 by one-way ANOVA with Bonferroni post-test.

Pulmonary delivery of MTBVAC improves the protective efficacy of the vaccine against a challenge with tuberculosis, in comparison to BCG administered by canonical subcutaneous route (FIG. 11).

Example 11

Figure 12:
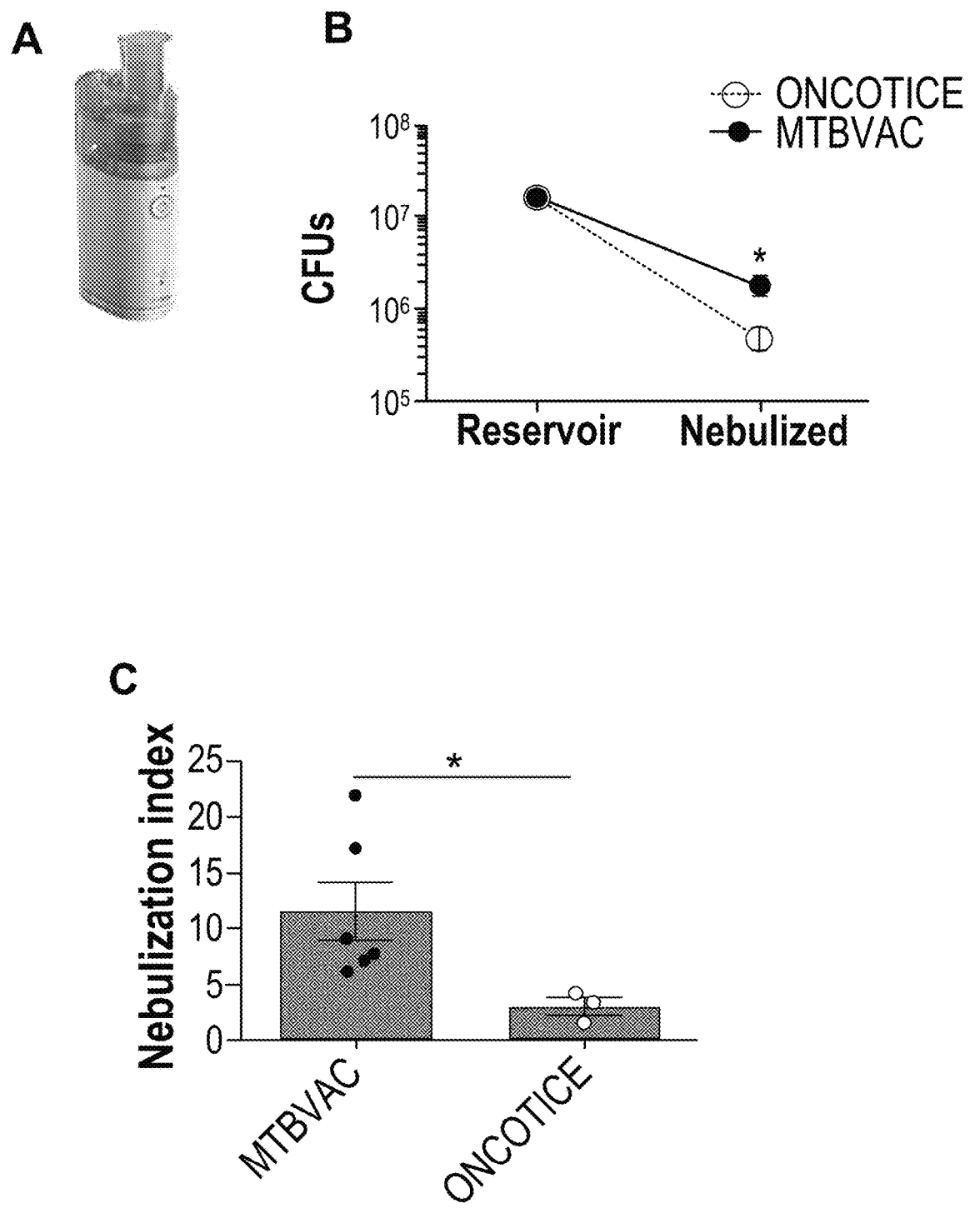

MTBVAC and OncoTICE® GMP vials were resuspended in 1 ml/vial, concentrations normalized at $10^7$ CFU/ml, and 2 ml of each vaccine preparation placed in the reservoir of the clinical nebulizer U100 (OMRON®). There are strong regulatory safety concerns about the intranasal delivery of vaccines in humans. However, aerosol administration is an accepted way to reach the pulmonary compartment in the clinic, and multiple commercial nebulizers authorized for human use are available. From a practical perspective, an important step to bring pulmonary administration of live mycobacteria to clinical development is the feasibility to deliver therapeutic vaccine doses through the aerosol route. To evaluate this, we measured the nebulization efficacy of GMP formulations of MTBVAC and BCG (OncoTICE®) adapted for human use, through the clinical nebulizer OMRON® U100 (FIG. 12A). We loaded the reservoir with MTBVAC or BCG resuspended in the corresponding eluent, and placed the nebulizer in horizontal position, connected through a plastic tube to a vacuum pump-coupled gas washing flask containing 5 ml of sterile water, where the nebulized fraction was recovered. Bacterial density in the reservoir was around $1.5 \times 10^7$ CFUs/ml for both vaccines. After 1 minute of nebulization, the mean amount of bacteria recovered in the nebulized fraction was $1.85 \times 10^6$ CFUs for MTBVAC and $5 \times 10^5$ for BCG (FIG. 12B). The mean efficacy of nebulization with respect to the initial bacterial load at the reservoir was 11.7% for MTBVAC and 3.1% for OncoTICE® (FIG. 12C).

We have identified certain characteristics of BCG and MTBVAC that could account for the differences observed in nebulization efficacy. Electronic microscopy images revealed lower bacterial length of MTBVAC (<1 μm) in comparison to BCG (>2 μm). Considering that the mean particle size released by clinical nebulizers is around 5 μm, it is realistic to speculate that clumping and bacterial size could crucially affect the efficacy of nebulization of different live vaccines. Such physical differential characteristic of MTBVAC would make it more favorable to be administered using clinical nebulizers.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for therapy in a human subject in need thereof, comprising administering a composition to the subject through a pulmonary route by oral inhalation using an aerosol technique, wherein the composition comprises a live-attenuated *M. tuberculosis* comprising an isolated microorganism belonging to a *M. tuberculosis* MTBVAC strain having: i) a PhoP− phenotype by inactivation by genetic deletion of the Rv0757 gene, wherein the open-reading frame (ORF) sequence of phoP consists of SEQ ID NO:4, and ii) a deletion of a second gene, Rv2930 (fadD26), that prevents PDIM production, wherein the open-reading frame (ORF) sequence of fadD26 consists of SEQ ID NO:2;
wherein the composition is administered at a dose of at least $10^6$ CFUs; and
wherein the method is a prophylactic method, and the subject is at risk of suffering from allergic asthma, or at risk of developing allergic asthma.

2. The method according to claim 1, wherein the composition is a lyophilized composition which optionally further comprises stabilizers, bulking agents, or buffers.

3. The method according to claim 1, wherein the subject is at risk of infection with *M. tuberculosis* or at risk of developing tuberculosis disease, or wherein the method is a secondary method and the subject is an infected patient.

4. The method according to claim 1, wherein the method further comprises targeting M2 macrophages and alleviating allergic responsiveness in the subject.

5. The method according to claim 1, wherein the method is for treatment of allergic asthma in the subject.

6. The method according to claim 1, wherein the subject is a neonate at risk of infection with *M. tuberculosis* or at risk of developing TB disease.

7. The method according to claim 1, wherein the method is for treatment of subjects infected with latent and/or active TB, and the subject is selected from neonates and non-neonate humans.

8. The method of claim 1, wherein the method is for treating eosinophilic esophagitis (EoE).

9. The method of claim 6, wherein the method is for prophylaxis against infections caused by *M. tuberculosis*.

10. The method of claim 7, wherein the non-neonate human is selected from children, adolescents and adults.

11. A prophylactic method for targeting M2 macrophages to alleviate an allergic response in a human subject in need thereof, comprising administering a composition to the subject through a pulmonary route by oral inhalation using an aerosol technique, wherein the composition comprises a live-attenuated *M. tuberculosis* comprising an isolated microorganism belonging to a *M. tuberculosis* MTBVAC strain having: i) a PhoP− phenotype by inactivation by genetic deletion of the Rv0757 gene, wherein the open-reading frame (ORF) sequence of phoP consists of SEQ ID NO:4, and ii) a deletion of a second gene, Rv2930 (fadD26), that prevents PDIM production, wherein the open-reading frame (ORF) sequence of fadD26 consists of SEQ ID NO:2;
wherein the composition is administered at a dose of at least $10^6$ CFUs; and
wherein the subject is at risk of suffering from allergic asthma, or at risk of developing allergic asthma.

12. The method according to claim 11, wherein the method is for treatment of allergic asthma in the subject.

13. The method of claim 11, wherein the method is for treating eosinophilic esophagitis (EoE).

* * * * *